(12) United States Patent
Gooding

(10) Patent No.: US 8,240,055 B2
(45) Date of Patent: Aug. 14, 2012

(54) ADAPTIVE, ERGONOMIC, MULTI-PURPOSE HAND-HELD TOOL WITH FLEXIBLE DRIVE SHAFT

(76) Inventor: Elwyn Gooding, Ann Arbor, MI (US)

( * ) Notice: Subject to any disclaimer, the term of this patent is extended or adjusted under 35 U.S.C. 154(b) by 0 days.

(21) Appl. No.: 12/851,647

(22) Filed: Aug. 6, 2010

(65) Prior Publication Data

US 2011/0036611 A1 Feb. 17, 2011

Related U.S. Application Data

(60) Division of application No. 12/207,146, filed on Sep. 9, 2008, now abandoned, which is a continuation-in-part of application No. 10/895,782, filed on Jul. 21, 2004, now abandoned.

(60) Provisional application No. 60/540,285, filed on Jan. 29, 2004, provisional application No. 60/540,996, filed on Feb. 2, 2004.

(51) Int. Cl.
*B23B 25/00* (2006.01)
(52) U.S. Cl. ............ 30/276; 464/59; 464/60
(58) Field of Classification Search ........... 464/57–60, 464/174, 52; 30/276
See application file for complete search history.

(56) References Cited

U.S. PATENT DOCUMENTS

| | | | | | |
|---|---|---|---|---|---|
| 1,561,537 | A | * | 11/1925 | Hayes | 464/40 |
| 2,491,653 | A | * | 12/1949 | Fitch | 464/115 |
| 3,015,969 | A | * | 1/1962 | Bratz | 74/502.5 |
| 3,085,406 | A | * | 4/1963 | Hanebuth | 464/52 |
| RE25,543 | E | * | 3/1964 | Ruegg et al. | 464/58 |
| 4,290,494 | A | * | 9/1981 | Blanz | 173/149 |
| 4,730,960 | A | * | 3/1988 | Lewis et al. | 408/127 |
| 5,052,404 | A | * | 10/1991 | Hodgson | 600/585 |
| 5,660,590 | A | * | 8/1997 | Deperrois | 464/69 |
| 6,318,923 | B1 | * | 11/2001 | Davis | 403/150 |

* cited by examiner

*Primary Examiner* — Kenneth E Peterson
(74) *Attorney, Agent, or Firm* — Gifford, Krass, Sprinkle, Anderson & Citkowski, P.C.

(57) ABSTRACT

An adaptive, ergonomic designed multi-purpose air motor driven hand-held trimmer that uses the air motor as the handle, has the air motor offset at an angle of 25 degrees to the fore and aft axis of the base plate and downward 10 degrees, to thereby have the center of gravity as near as possible to the wrist of the operator so that there will not be a constant bending of the wrist or exerting of constant hard pressure on the tissue at the base of the hand, thus virtually eliminating the possibility of the operator acquiring the carpal tunnel syndrome. Further disclosed are particular flexible drive shafts which may be used in the tool.

6 Claims, 18 Drawing Sheets

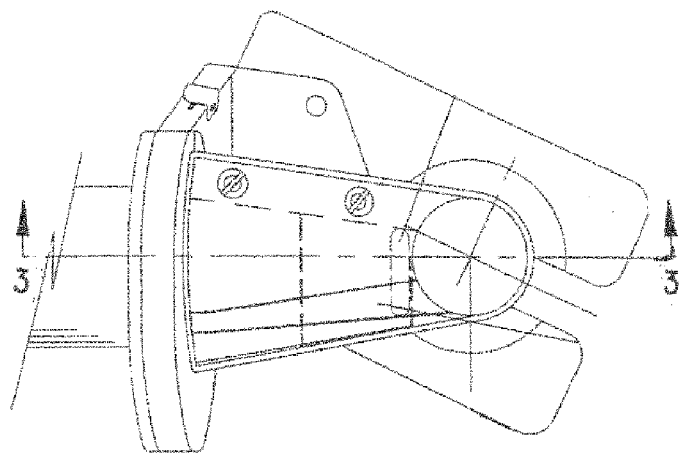
FIG.3A
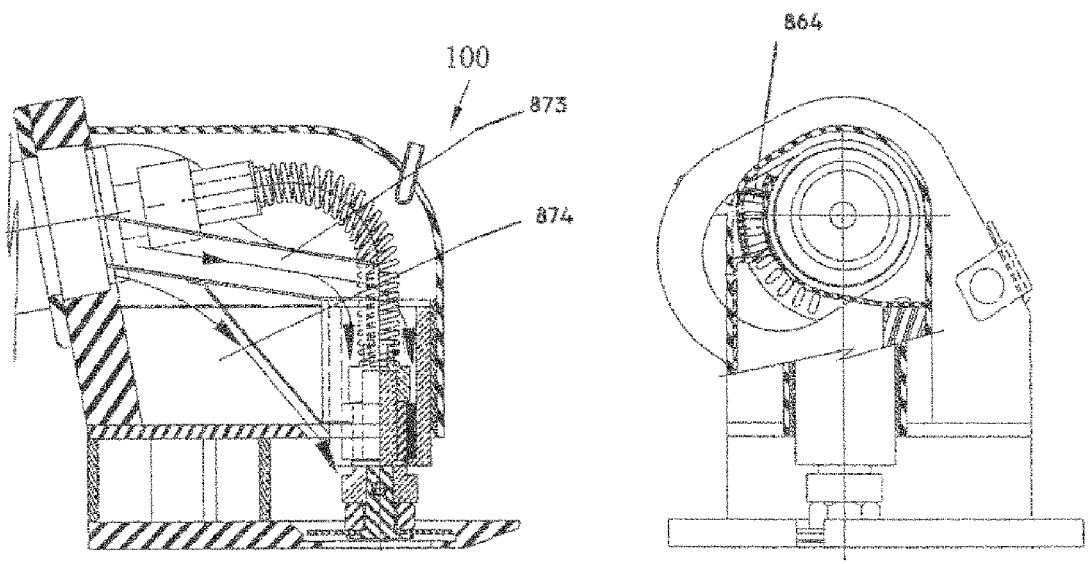
FIG.3B                    FIG.3C

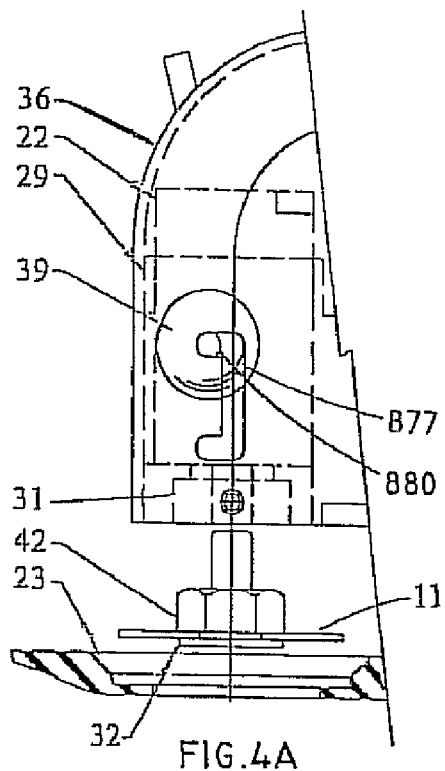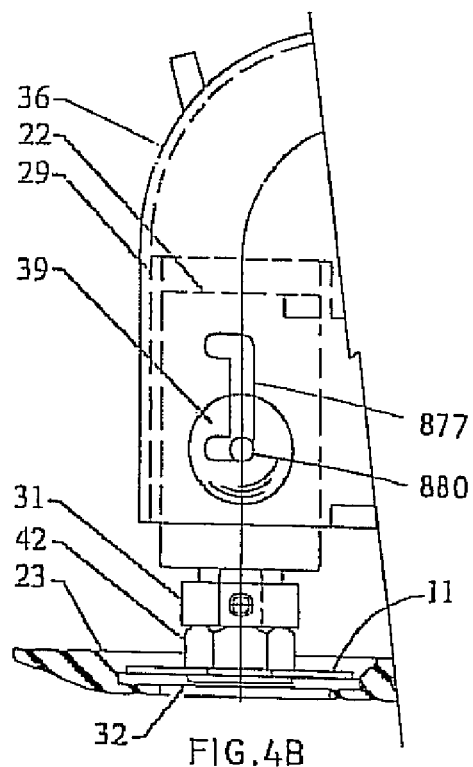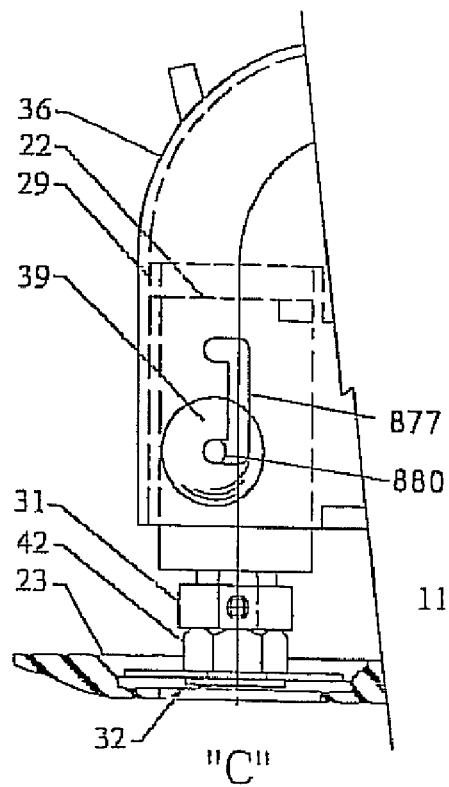

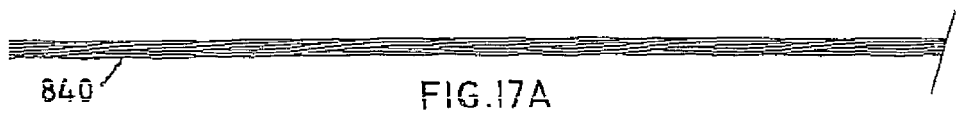
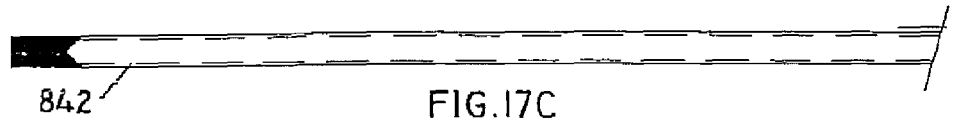
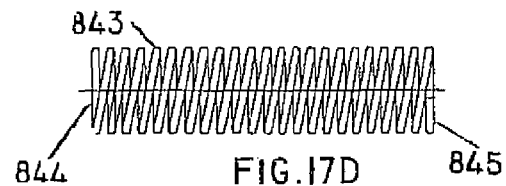
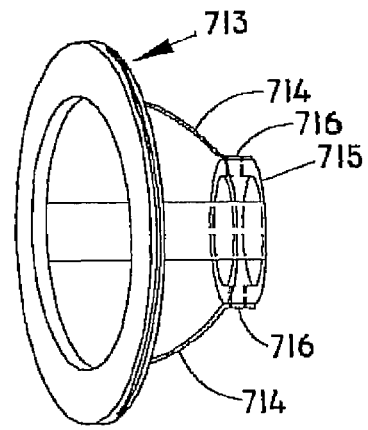
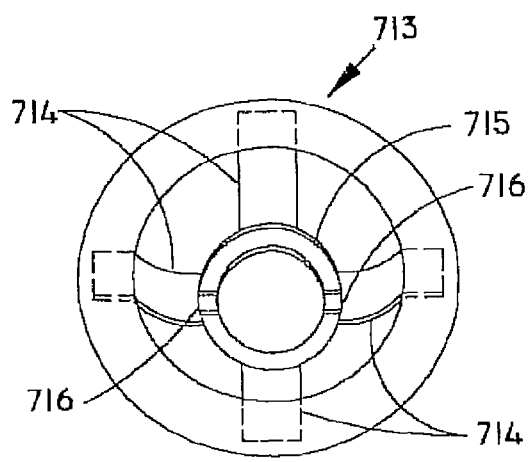
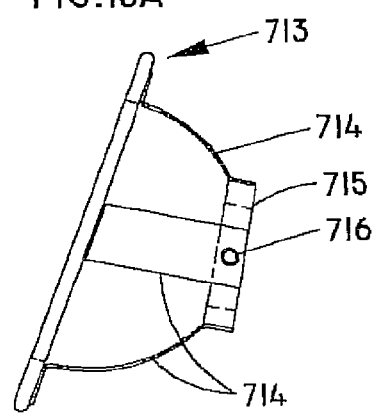

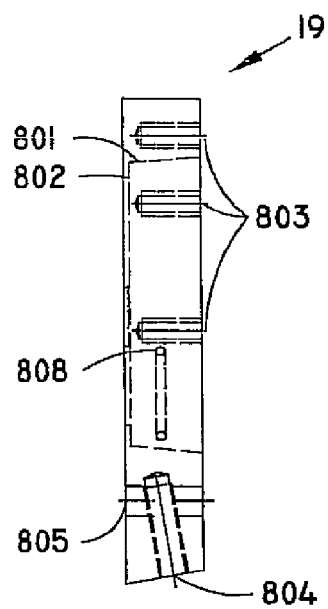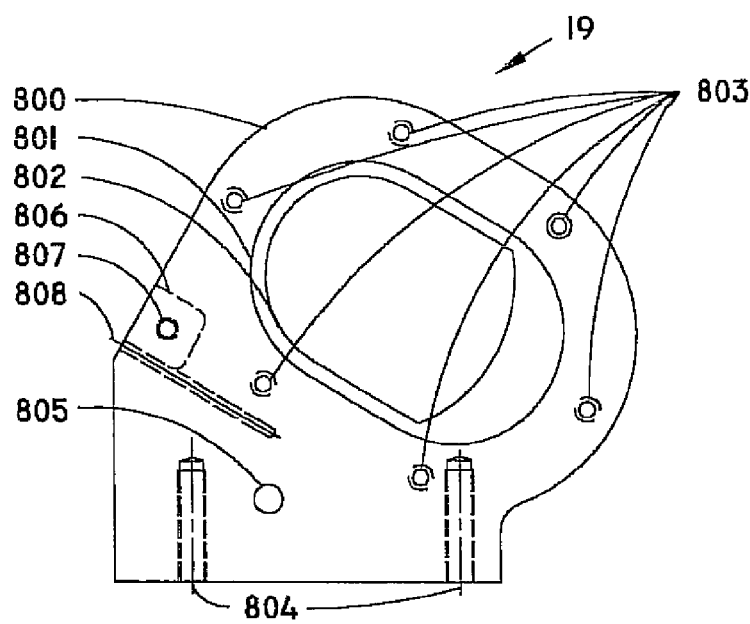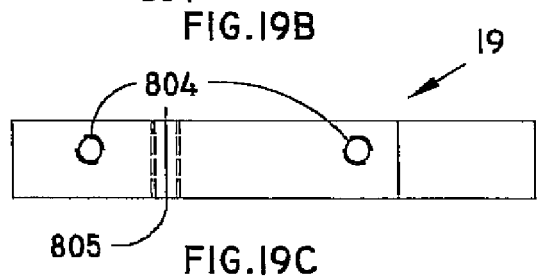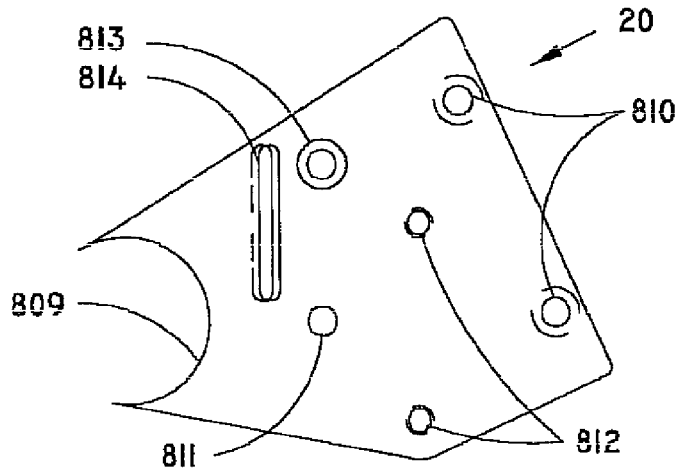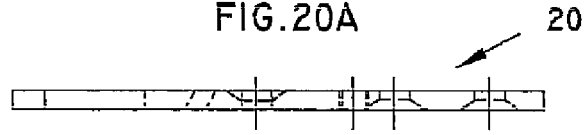

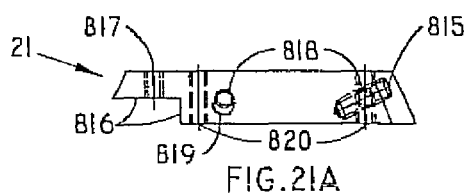
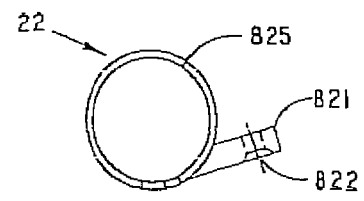
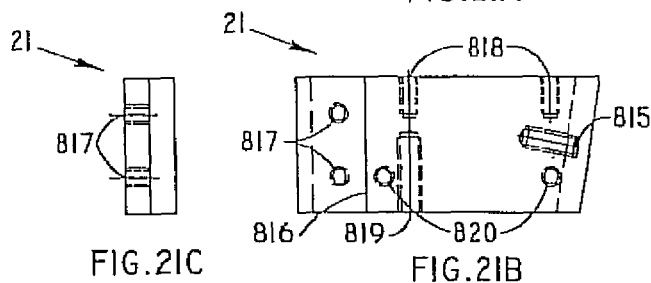
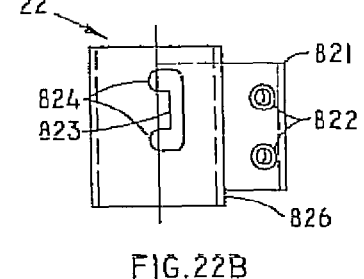
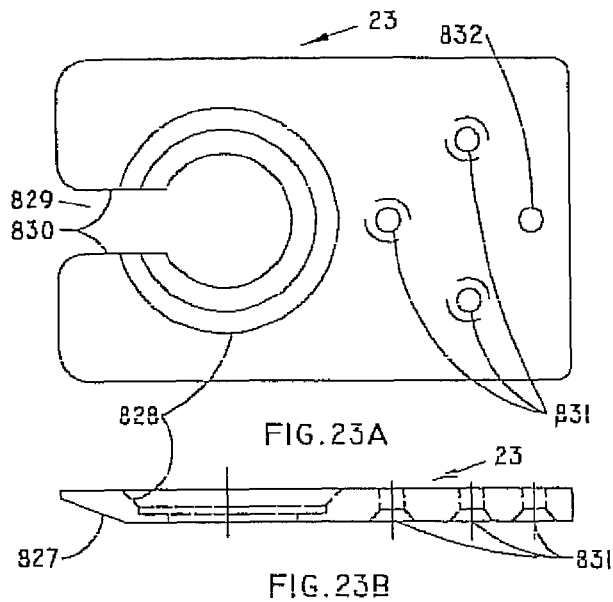
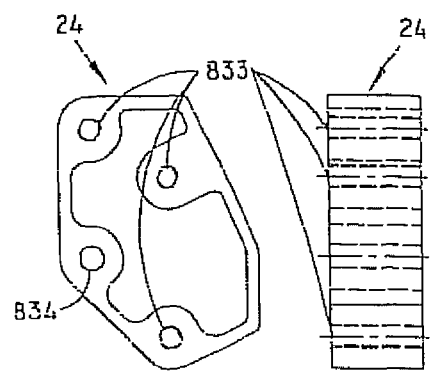
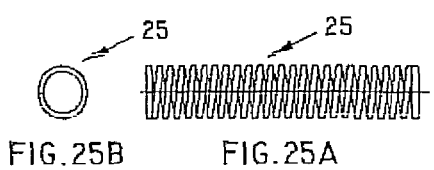
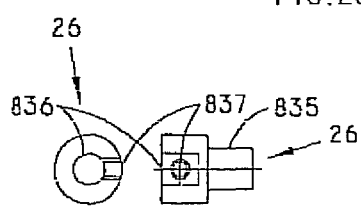
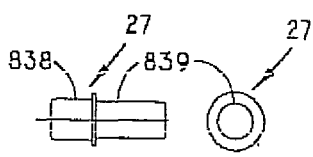

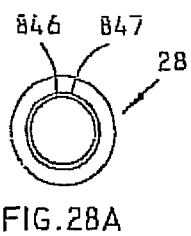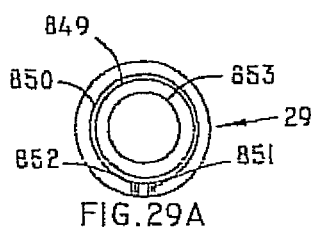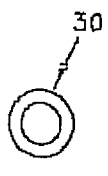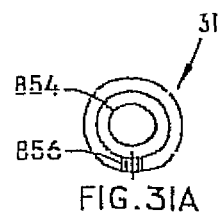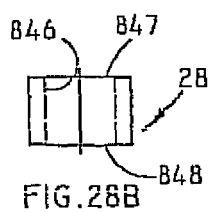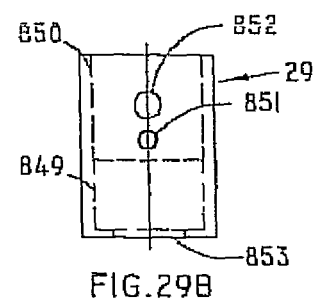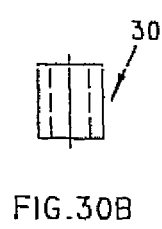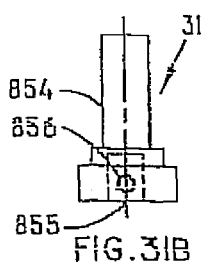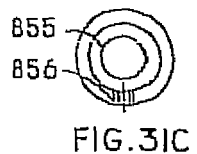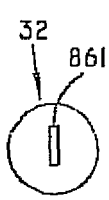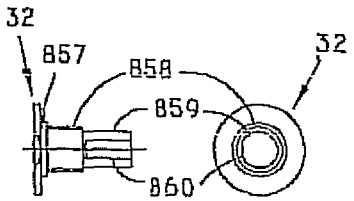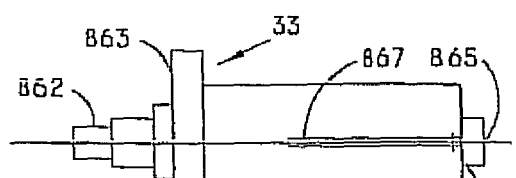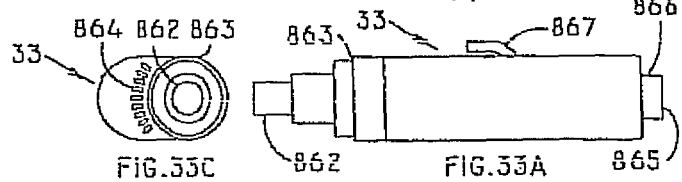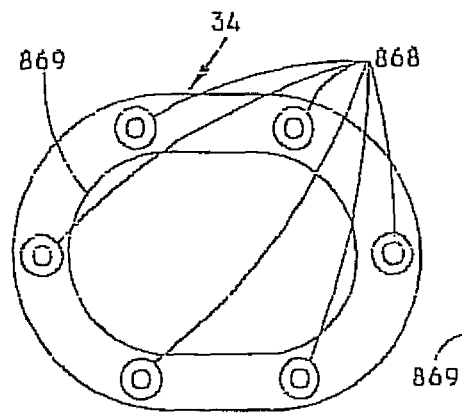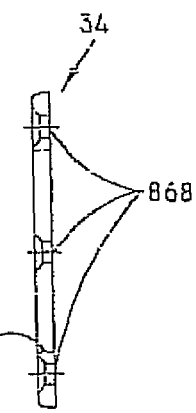

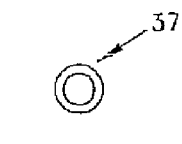
FIG. 37A
FIG. 37B
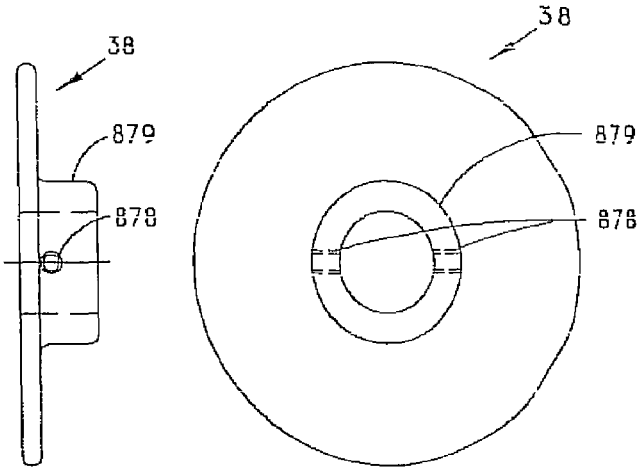
FIG. 38A  FIG. 38B
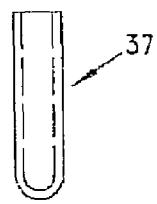
FIG. 39A
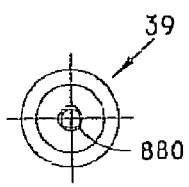
FIG. 39B
FIG. 40A
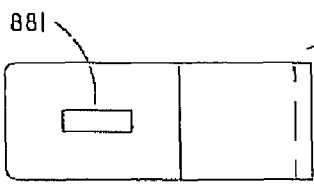
FIG. 40B
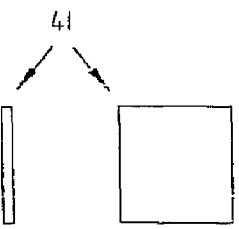
FIG. 41A  FIG. 41B
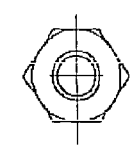
FIG. 42A
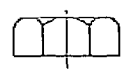
FIG. 42B
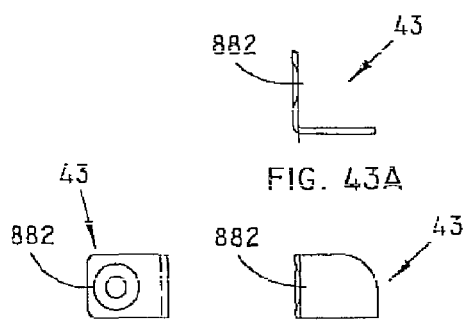
FIG. 43A
FIG. 43C  FIG. 43B

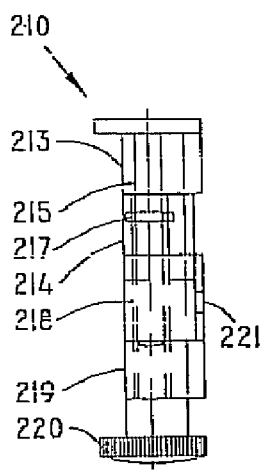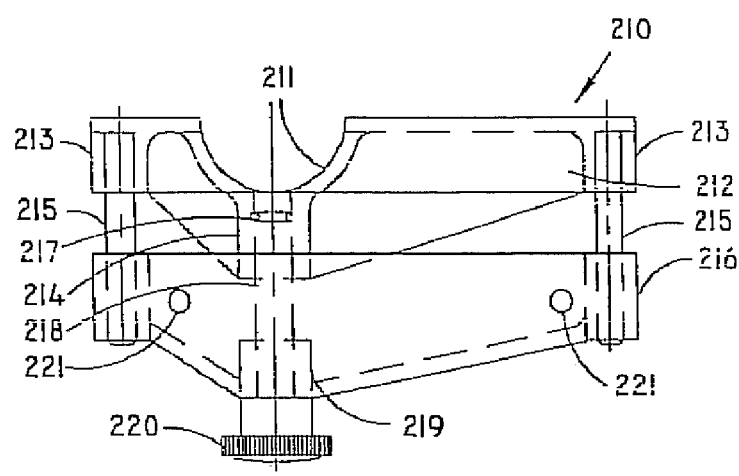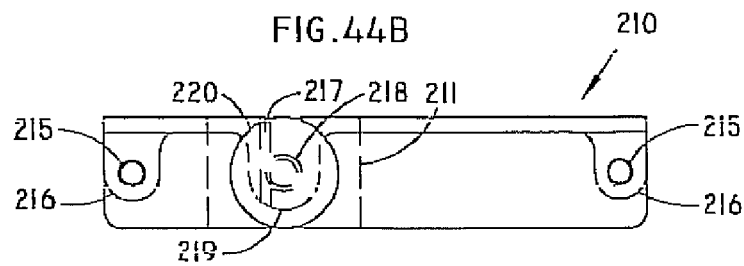
FIG.44A  FIG.44B
FIG.44C
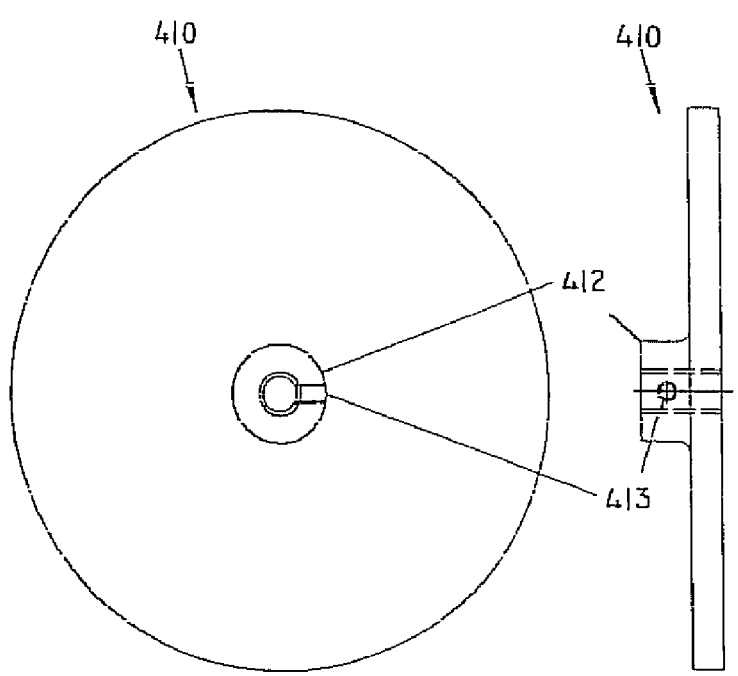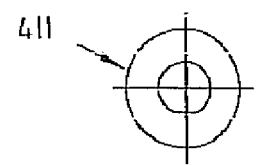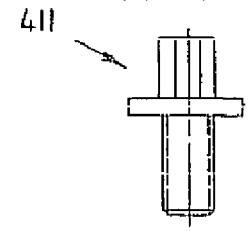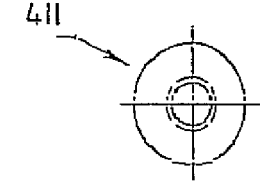
FIG.45A  FIG.45B
FIG.46B
FIG.46A
FIG.46C

ADAPTIVE, ERGONOMIC, MULTI-PURPOSE HAND-HELD TOOL WITH FLEXIBLE DRIVE SHAFT

CROSS-REFERENCE TO RELATED APPLICATIONS

This application is a divisional of U.S. patent application Ser. No. 12/207,146 filed Sep. 9, 2008, now abandoned, which is a continuation-in-part of U.S. patent application Ser. No. 10/895,782 filed Jul. 21, 2004, now abandoned, which claims priority of Provisional Application Ser. No. 60/540,285, filed Jan. 29, 2004 entitled "Adaptive, Ergonomic and Multi-Purpose Air Motor Driven Hand Held Trimmer", as well as Provisional Application Ser. No. 60/540,996, filed Feb. 2, 2004 and also entitled "Adaptive, Ergonomic and Multi-Purpose Air Motor Driven Hand Held Trimmer".

BACKGROUND OF THE INVENTION

1. Field of the Invention

The present invention relates generally to portable and motorized power tools. More specifically, the present invention teaches an adaptive, ergonomic and multi-purpose air motor driven held-held tool which is capable of interchangeably holding a wide variety of tool bit attachments, and which can be flexibly incorporated into a variety of fixturing applications. Additionally, the present invention includes a coiled drive shaft providing the characteristics of flexibility, force and shock absorption; and which is capable of transferring high levels of torque to a tool bit or the like.

2. Description of the Prior Art

Conventional air motor driven and hand-held circular saw blade trimmers are known in the art and are used such as in the automotive industries for trimming synthetic materials in the fabrication of cushions. In general, these trimmer devices are designed with the air motor component arranged vertically in a cast aluminum housing, and with a handle extending downward at about a 45 degree angle and having an air supply hose attached to an end of the handle.

Such an arrangement places the weight of the unit very far forward of the wrist of the user, which must be held continually in a bent position, as well as exerting pressure on the base of the user's hand. Such conditions have been known to lead to the carpal tunnel syndrome which results from the median nerve, which passes through a narrow tunnel of the wrist (carpals), and a ligament at the base of the hand, being compressed by the surrounding tissue. Symptoms include numbness and pain in the hand and wrist. The condition often necessitates surgery to relieve pressure on the medial nerve.

Hand-held tools of this type shown in the prior art include that of U.S. Pat. No. 6,641,467, issued to Robson et al., which teaches a power tool including a motor pivotally mounted within a housing of the tool. The tool is able to accept any one of a plurality of attachment members such as a drill spindle head, reciprocating saw blade and the like.

U.S. Pat. No. 5,588,903, issued to Pennison, teaches an ergonomic power tool including a main body portion having a cavity and a handle portion coupled to the main portion. The main body portion has a first longitudinal axis and the handle portion a second longitudinal axis formed at an acute angle with respect to the first longitudinal axis. A coating of material is applied to an exterior of the handle portion to help minimize vibrations transferred to the operator's hand.

U.S. Pat. No. 4,751,922, issued to DiPietropolo, discloses an improved flexible medullary reamer for shaping the medullary space of bones. The shaft is comprised of a single and solid elongate element bored throughout its length. Attached to the shaft's opposite ends, respectively, are a cutting head and a means of connecting the shaft to a drive mechanism, both of which may also be internally bored.

U.S. Pat. No. 5,908,423, issued to Kashuba, teaches another variant of a flexible medullary reaming system and including a first reamer coupled to the distal end of a flexible shaft for rotation therewith and to prepare the distal portion of such as the medullary canal of a femur bone. A second reamer is coupled with the proximal portion of the shaft to form the proximal end of the lateral portion of the canal and/or the medial calcar region of the canal. A metaphyseal template having the shape of a prosthesis guides the reaming apparatus in forming the calcar region of the canal.

Finally, U.S. Pat. No. 5,820,464, issued to Parlato, teaches a flexible shaft assembly for transmitting rotary motion between spaced components that are mounted on articulated members. The flexible shaft exhibits a significant bending flexibility and includes a proximal section connected to a driver device, a distal section connector to a driven component, and an intermediate section. The proximal and distal sections are free to bend and rotate about a curved axis. One or more rigid sleeves are coaxially mounted on the intermediate section for reducing torsional deflections of the shaft as it rotates.

SUMMARY OF THE PRESENT INVENTION

The present invention discloses an adaptive, ergonomic, multi-purpose and hand-held trimmer which, among other features, minimizes the possibility of an operator acquiring carpal tunnel syndrome when utilized in any one of a number of differing hand-held applications.

A tool of the present invention includes a housing and a motor which is supported by the housing. The motor is elongated along a center line and is configured to be gripped by a user's hand. The motor has a power shaft which is driven thereby when the motor is energized. An output shaft is rotatably supported in the housing and is configured to receive and retain a tool bit. A coupling joins the power shaft and the output shaft so that power can be transmitted therebetween. The housing is configured so that the center line of the motor and a central axis of the output shaft intersect so as to form an angle which is less than 90 degrees. In particular embodiments, the angle is at least 75 degrees, and in certain embodiments is in the range of 75-90 degrees. In one specific embodiment, the angle is approximately 80 degrees.

In another particular embodiment, the housing includes a base plate portion which contacts a workpiece when the tool is in use. The base plate portion has a fore and aft axis defined therethrough so that the output shaft lies along that axis and so that when the tool is in use, the user moves it along the fore-aft axis. The motor is disposed so that its center line intersects a plane which is defined so as to intersect the fore-aft axis and the central axis of the output shaft. The center line intersects the plane at an angle which is no more than 30 degrees, and in particular embodiments in a range of 10-30 degrees. In specific embodiments, the tool is configured so that its center of gravity is located in the motor, proximate the portion thereof which a user grips when operating the tool.

Also disclosed herein is a flexible shaft which may be utilized to couple the power shaft to the output shaft. As disclosed herein, the flexible shaft may be a flexible coiled drive shaft, which in particular embodiments is wrapped with a reinforcing composite material such as a carbon fiber reinforced polymer.

Brief descriptions of some particular embodiments follow. In one group of embodiments, a composite plastic air motor housing includes a main arcuate shaped and three-dimensional body having an arcuate shaped and central opening. The composite air motor housing is attached to a composite plastic intermediate plate, which further includes a polygonal shape with a plurality of mounting locations and an arcuate inner profile. The composite air motor housing is attached to a vertical support positioned on the top surface of the intermediate plate.

An aluminum guide cylinder is positioned with the alignment projection seated in a mating vertical notch in the end of the vertical support, at the end opposite the air motor housing. The guide cylinder is further secured in place with two number 6-32 by ½ inch long cadmium-plated flat head machine screws.

A Teflon plastic base plate includes a small portion on the bottom of the fore end sloped upward, so that the edge is about one-third the thickness of the base plate. The base plate further exhibits an inwardly tapered and circular recess and has a narrow slot on the center line of the fore and aft axis, from the edge of the sloped portion to the recess. Disposed between the intermediate plate and base plate is a composite plastic or aluminum spacer which is secured to the vertical support.

A flexible coiled drive shaft is formed into a series of rings that are spaced the diameter of the wire apart and with the end rings closed. A first closed end of the coiled drive shaft is seated over a projection on a brass female coupling, whereas a second end is seated over a projection associated with a brass male coupling. These three components are then silver soldered together.

A steel roller bearing is press fitted into an aluminum cylindrical vertical bearing housing. An inner ring of the vertical roller bearing is press fitted onto a male projection of a female coupling for a circular saw trimming blade mounting shaft. An inner ring on a female coupling is inserted into the vertical roller bearing and the female coupling on the flexible coiled drive shaft is positioned over a male projection of a circular saw trimming blade mounting shaft.

An air motor is positioned with a coupling end thereof seated in the recess in the air motor composite plastic housing and secured by positioning a composite plastic retainer plate over the drive end of the motor. The motor is then secured to the retainer plate with flat head machine screws inserted through apertures formed about the perimeter of the plate.

A fabricated sheet plastic discharged air baffle is positioned with its semicircular end seated in the air motor housing and with a horizontal hold down flange on the top surface of the vertical support. A thin bead of sealant glue is placed over the edges of the discharged air baffle at the air motor housing, along the edge of the intermediate plate and under the edge that is adjacent the vertical cylinder guide.

The discharged air baffle exhibits an upper duct that directs discharged air from the air motor through four upper slots to the area above the vertical roller bearing to assist in lubricating the bearing. Additionally, a lower duct directs the discharged air through five associated lower slots, through a slot in the intermediate plate to the area above the circular saw trimming blade and to assist in keeping the saw blade teeth free of chips.

The flexible coiled drive shaft and vertical roller bearing housing sub-assembly is inserted into the vertical cylinder guide and the male coupling is inserted into the female coupling on the air motor and secured by tightening the coupling with open-end wrenches. A thermoformed plastic cover is positioned over the discharged air baffle to enclose the assembly and is secured with three screws.

A cylindrical plastic plug is inserted in a small hole located in the top front of the plastic cover after three drops of a lightweight grade oil is inserted to lubricate the vertical roller bearing. An additional and substantially "U" shaped aperture is defined through a side wall location of the plastic cover, the purpose for which will be subsequently described.

An air motor grip circular retaining plate is positioned over an air inlet projection on the end of the air motor. The air motor speed control plate has a piece of Velcro® loop adhesive bonded to its top surface. The speed control plate is positioned with a recess in the bottom seated over an air motor trigger and the Velcro® loop on the bottom surface at the opposite end mating with a Velcro® hook pad that is mounted on the air motor toward the air inlet end.

A knob is inserted through the vertical slot in the cover and vertical cylinder guide and into a mating hole in the vertical roller bearing housing for locking the vertical roller bearing housing in the raised and in the lowered locked positions.

A regular circular trimmer saw blade is positioned on the circular saw blade mounting shaft so that its array of teeth (not shown) will be rotated clockwise when the shaft is driven. The saw blade is secured by tightening an associated hex nut.

The male projection of the circular saw blade mounting shaft is inserted into the female coupling on the bottom of the flexible drive shaft and the circular saw trimming blade mounting shaft is lowered and secured by inserting and tightening an Allen head set screw in the side of the female coupling. With the circular saw trimming blade mounting shaft secured, the vertical roller bearing housing is rotated clockwise to the locked position as shown in FIG. 4C and locked by tightening the black plastic knob.

A formed plastic retainer clip is positioned in a notch in the front face of the air motor housing and secured with a flat head machine screw. An Allen wrench is placed in the small hole in the sloped edge of the air motor housing and just below the plastic retainer clip and then turned counterclockwise to be held under the clip. With an air supply adapter inserted into the mating threaded air inlet hole in the air motor and connected to a factory air supply, the adaptive, ergonomic, air motor driven circular saw blade hand-held trimmer is ready to be used.

The air motor is grasped by the hand so that the total weight is as close to the wrist as possible. The trimmer motor utilizes a very unique flexible coiled drive shaft that permits it to be positioned in a natural unstressed position while in use by the operator. In a preferred application, the air motor is at an angle of 30 degrees or less, and in a specific embodiment, 25 degrees from the fore and aft axis of the base plate. The motor is also disposed so that the axis of its center line and the axis of the output shaft form an angle which is less than 90. The air motor is also rotated 30 degrees clockwise about its fore and aft axis for easy manipulation of the speed control trigger, that is done by the slight squeeze of a cushioned plate over the trigger.

BRIEF DESCRIPTION OF THE DRAWINGS

FIG. 3A is a first sectional illustration of an air discharge baffle associated with an air motor incorporated into the hand-held trimmer configuration according to the present invention;

FIG. 3B is a second sectional illustration, similar in regards to that previously shown in FIG. 2, and illustrating in particular the arrangement of the upper and lower duct slots formed in the air discharge baffle;

FIG. 3C is a third rotated and sectional view of the illustration of FIG. 3B, and showing from another angle the slotted arrangement formed in the upper and lower ducts;

FIG. 4A is first sectional illustration of a tool change subassembly associated with the hand-held trimmer illustrating the trimmer saw blade and mounting shaft assembly in a raised position;

FIG. 4B is a second sectional illustration of the tool change subassembly and with the saw blade in a lowered position;

FIG. 4C is a third succeeding sectional illustration of the tool change subassembly and with the vertical roller bearing housing rotated clockwise to a locked position;

FIG. 17A is a first illustration of a length of a multi-strand fine steel wire forming a substrate of a composite flexible coiled drive shaft and which is incorporated into the hand-held trimmer device of the present invention;

FIG. 17B is a succeeding illustration of a pre-impregnated filament of a unilateral composite plastic tightly wrapped in a spiral pattern around the steel cable of FIG. 17A;

FIG. 17C is a yet succeeding illustration of a finely woven carbon/graphite sleeve, pre-impregnated with a thermosetting plastic, that is tightly secured about the composite structure of FIG. 17B;

FIG. 17D is a further illustration of the composite construction of FIG. 17C formed into a flexible and coiled drive shaft exhibiting closed rings at first and second ends;

FIG. 18A is a top view of a hand grasp retaining plate forming a portion of the hand-held trimmer of the present invention;

FIG. 18B is a side view of the hand grasp retaining plate illustrated in FIG. 18A;

FIG. 18C is a front view of the hand grasp retaining plate;

FIG. 19A is a side view of a motor housing in which the air motor is contained;

FIG. 19B is a back view of the motor housing illustrated in FIG. 19A;

FIG. 19C is a further rotated bottom of the motor housing in which the air motor is held;

FIG. 20A is a top view of an intermediate plate to which the motor housing is attached;

FIG. 20B is a side view of the intermediate plate of FIG. 20A;

FIG. 21A is a top view of a vertical support configured for supporting the motor housing at one end and the vertical cylinder support at an opposite end;

FIG. 21B is a side view of the vertical support of FIG. 21A;

FIG. 21C is an end view of the vertical support;

FIG. 22A is a top view of the vertical guide cylinder for the vertical roller bearing or ball bearing housing;

FIG. 22B is a side view of the vertical guide housing of FIG. 22A;

FIG. 23A is a top view drawing of the base plate;

FIG. 23B is a side view of the base plate;

FIG. 24A is a top view of the spacer that is mounted between the base plate and the intermediate plate;

FIG. 24B is a rotated end view of the spacer;

FIG. 25A is a side view drawing of a flexible coiled drive shaft similar to that previously illustrated in FIG. 17D;

FIG. 25B is a rotated end view of the flexible coiled drive shaft of FIG. 25A;

FIG. 26A is a side view drawing of the female coupling that is mounted on one end of the flexible coiled drive shaft to mate with the coupling on which the inner race for the vertical roller bearing is mounted;

FIG. 26B is a rotated end view of the coupling of FIG. 26A;

FIG. 27A is a side view drawing of the male coupling that is mounted on the flexible coiled drive shaft to mate with the coupling on the air motor;

FIG. 27B is a rotated end view of the male coupling of FIG. 27A;

FIGS. 28A and 28B are top and side views of the vertical roller bearing;

FIGS. 29A and 29B are top and side views of the vertical roller bearing housing;

FIGS. 30A and 30B are top and side views of the inner ring for the vertical roller bearing;

FIGS. 31A-31C illustrate a first top view, as well as second and third side and bottom views of female coupling for mating with the circular saw blade mounting shaft, for mounting the vertical bearing inner ring and for mating with the female coupling on the flexible coiled drive shaft;

FIGS. 32A-32C illustrate a first side view, as well as second and third opposite end views of the circular saw blade mounting shaft;

FIG. 33A illustrates a first side view of the air drive motor;

FIG. 33B illustrates a second rotated top view of the air drive motor in FIG. 33A;

FIG. 33C illustrates an end view of the air drive motor with air discharge slots;

FIGS. 34A and 34B illustrate top and side views of the air drive motor retainer plate;

FIGS. 37A and 37B are top and side view drawings of the lubricating hole plug;

FIGS. 38A and 38B are side and back view drawings of the hand grasp retaining plate;

FIGS. 39A and 39B are end and top view illustrations of the vertical roller bearing housing raising and lowering knob;

FIGS. 40A and 40B are side and bottom views of the speed control cover plate;

FIGS. 41A and 41B are side and top views of the Velcro® speed control plate hold down pad;

FIGS. 42A and 42B are top and side views of the left-hand threaded hex nut for securing the circular trim blade to the mounting shaft;

FIGS. 43A-43C is a three-view drawing of the retainer clip for the Allen wrench that is used with the Allen set screws in the couplings;

FIGS. 44A-44C are side, top and end view illustrations of the horizontal adjustable vertical fence that is bolted to the bottom of the base plate of the first alternate embodiment of the invention to adapt it to be used as a hand-held router; the horizontal adjustable vertical fence assembly mounted on the bottom of the base plate is also used in the second alternate embodiment of the invention in which the base plate is attached upside down with the bottom of the base plate flush with the top surface of a small wooden rectangular stand to thereby adapt the invention to be used as a small tabletop router;

FIGS. 45A and 45B are top and side view drawings of the disk that is mounted on the shaft shown in FIGS. 46A-46C;

FIGS. 46A-46C illustrate side and first and second end views of the shaft that are in turn attached to adapt the third alternate embodiment of the invention to be used as an abrasive paper or emery cloth sander, as a cloth buffer or a soft fleece bonnet hand-held polisher;

DETAILED DESCRIPTION OF THE INVENTION

Figure 1:
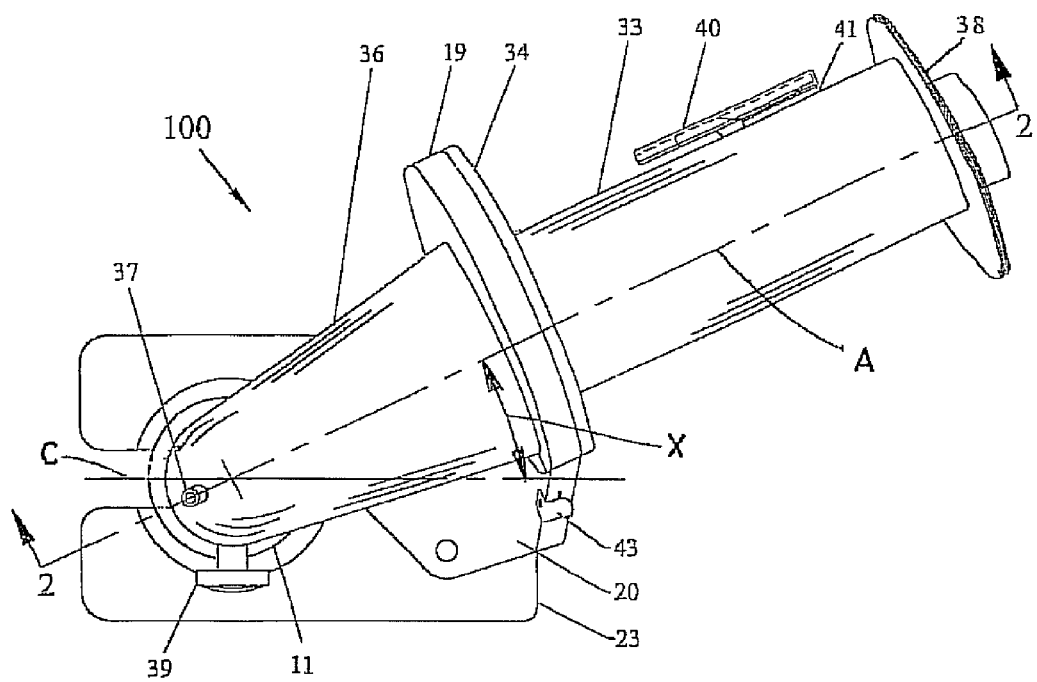
FIG. 1 is a top view of an embodiment of the adaptive, ergonomic, air motor driven circular saw blade hand-held trimmer configured in accordance with a preferred embodiment of the present invention.
Figure 2:
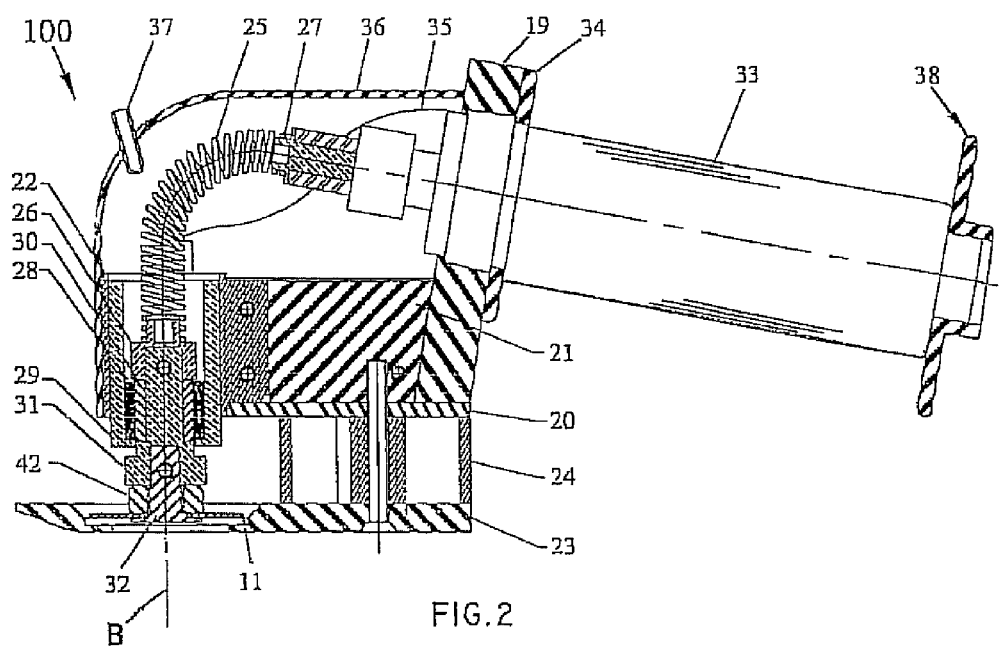
FIG. 2 is a cross-sectional view taken along line 2-2 of FIG. 1 and illustrating the inner working components of the adaptive, ergonomic, hand-held trimmer of FIG. 1.

Referring to FIGS. 1 and 2, an ergonomic multi-purpose and hand-held trimmer is illustrated at 100 in accordance with a first preferred embodiment of the present invention. In particular, and as will be subsequently described, the present invention provides a unique combination of flexible coiled drive shaft and air motor that makes it possible to achieve geometries which position the air motor in a natural/unstressed position while being operated, thereby virtually eliminating the constant bending of the wrist and pressure on the tissue at the base of the hand that lead to carpal tunnel syndrome.

The tool of the present invention is configured so that when in use, the user's hand and wrist assume a comfortable and normal position. The tool is further configured so as to balance in the user's hand, with the center of gravity of the tool preferably located close to, or within, the user's grip. This is in contrast to prior art tools of this type which required that the user's wrist assume an unnatural position. As will be seen from FIGS. 1 and 2, the tool includes a housing 19 which is configured to support a motor 33. As shown herein, the motor 33 is an air-powered motor; however, it is to be understood that electrically powered motors, including cordless motors as well as other types of motors, may be similarly employed. As shown in the figures, the motor 33 is generally elongated in profile, and in that regard extends along a center line A. The motor includes an output power shaft terminating in a coupling 31. When the motor is energized, it drives the shaft. The housing also includes an output shaft rotatably supported therein. The output shaft is configured to receive and retain a tool, such as a cutting tool 32. The shaft includes a coupling member 26, and a coupling, in this instance the flexible coiled drive shaft 25, is disposed so as to connect the power shaft of the motor to the output shaft of the tool so that the motor 33 may drive the tool 32.

As specifically shown in FIG. 2, the output shaft rotates about a central axis B, and it is a notable feature of the present invention that the center line A of the motor 33 intersects the central axis B of the output shaft at an angle which is less than 90 degrees. As shown in FIG. 2, the center line A and axis B intersect at an angle of approximately 80 degrees; however, it is to be understood that this angle may be varied depending upon a particular user and a particular tool configuration. In general, the angle will be at least 75 degrees, and is typically in a range of 75-90 degrees. In some instances, the tool may be configured so the angle may be varied so as to adjust the tool for particular users. As shown in the figures, the motor 33 has a housing which is configured to be grasped by the user in the manner of a handle during the use of the tool. Toward that end, the motor housing will typically have a diameter in the range of 1-2.5 inches.

It has been found that by so configuring the tool, the user's hand assumes a comfortable and natural position when the tool is being used. This ergonomic design eliminates stress which can lead to injury. Furthermore, the configuration of this design moves the center of gravity of the tool to a location within the body of the motor 33 so that when the tool is being used, the center of gravity of the tool is near or within the portion gripped by the user. This improves the balance of the tool and minimizes unnecessary torque on the user's wrist.

In further embodiments, the tool of the present invention may be configured so as to further minimize stress on the user's wrist. Toward that end, the motor 33 may be positioned so that it is at an angle relative to the normal path of travel of the tool described when it is in use. As will be seen from FIG. 1, the tool includes a base plate portion 23 which is configured to contact a workpiece and support the tool thereupon during use. The base plate portion defines a fore-aft axis C therethrough such that the output shaft and associated tool 32 lie along this axis so that when the tool is in use the user will move it along the fore-aft axis. As will be seen from FIGS. 1 and 2, a plane may be defined which passes through the fore-aft axis C and through the central axis B of the output shaft. In the FIG. 1 illustration, this plane will generally lie along the fore-aft axis C and be disposed so as to project vertically (along the Z axis) from the plane of the page of the drawing sheet. As shown in FIG. 1, the housing 19 is configured so that the motor 33 is supported so that its center line A intersects this plane at an angle, shown as angle X in FIG. 1, which angle X is in the range of 0-30 degrees. In a specific embodiment of FIG. 1, this angle X is approximately 25 degrees. It has been found that by offsetting the motor in this manner, the ergonomics of the tool of the present invention are further improved.

In view of the general principles set forth above, it will be understood that various embodiments of hand-held tools may be implemented. What follows is some description of some particular and specific embodiments. These embodiments will be described with reference to FIGS. 1 and 2, as well as to the figures which follow.

Referring again to FIG. 1 as well as to the cross-sectional view of FIG. 2, the adaptive, ergonomic, circular saw blade hand-held trimmer includes a composite plastic air motor housing 19 and which is further illustrated in the top, side and bottom views of FIGS. 19A-19C. As shown in detail in FIG. 19A, the air motor housing 19 includes a main arcuate shaped and three-dimensional body 800 having an elongated recess 801 for nesting the drive end of the air motor 33 (see also FIGS. 33A-33C). There is an elongated arcuate opening 802 in the front face providing clearance for the air motor drive shaft 862, coupling and the discharged air slots 864. A first plurality of 6-32 tapped holes 803 are positioned at spaced locations about the elongated recess 801 for the screws that attach the air motor retaining plate 34 (see also FIGS. 34A-34C) to the air motor housing 19. There are two 10-24 tapped holes 804 in the bottom for the screws that attach the air motor housing 19 to the intermediate plate 20 (see also FIGS. 20A-20C). There is an 11/64 drilled hole 805 for the screw that attaches the air motor housing 19 to the vertical support 21 (see also FIGS. 21A-21C). There is a small recess 806 in the front face of the air motor housing 19 with a 6-32 tapped hole 807 at its center for the screw for the attachment of the Allen wrench retainer clip 43 (see also FIGS. 43A-43C) to the air motor housing 19. There is a 3/32 drilled hole 808 in the sloped side of the air motor housing 19 for storage of an Allen wrench that is used for tightening the set screws in the couplings 26, 30 and 31.

The composite intermediate plate as best shown in FIGS. 20A-20C, is of polygonal shape, has a semicircular arc 809 for seating of a corresponding area of the bottom outer circumference of the vertical cylinder guide 22 (see also FIGS. 22A-22C). Near the opposite end are two holes 810 for the number 10-24 by 5/8 inch long cadmium-plated flat head machine screws for attachment of the composite air motor housing 19. There is a 3/16 inch drilled hole 811, two number 10-24 tapped holes 812 and one hole 813 for a number 10-24 flat head machine screw in the top surface. There is an elongated angled slot 814 that directs a portion of the discharged air from the air motor downward in the area above the circular saw trimming blade (see also FIGS. 3A-3C).

The composite plastic vertical support, as best shown in FIGS. 21A-21C, has one end angled at 80 degrees to the horizontal, with an angled 10-24 tapped hole 815 for the screw for the attachment of the composite air motor housing 19. At the opposite end is a vertical notch 816 for mating with the projection on the vertical guide cylinder 22 (see also FIGS. 22A-22C). There are two 6-32 tapped holes 817 for the attachment of the vertical guide cylinder 22. There are two 6-32 tapped holes 818 in the top for attachment of the discharged air baffle 34 (see also FIGS. 34A-34C). There is a 10-24 tapped hole 819 in the bottom for the joint attachment of the intermediate plate 20, the base 23 (see also FIGS. 23 and 23B), with the spacer 24 (see also FIGS. 24A and 24B) in between as shown in FIG. 2. There are two number 6-32 holes 820 in the side near the bottom for the screws for the attachment of the drive mechanism cover 36 (see also FIGS. 36A-36C).

An aluminum vertical guide cylinder 22 (see also FIGS. 22A and 22B) is positioned with the alignment projection 821 seated in the mating vertical notch 816 in the end of the vertical support 21, at the end opposite the air motor housing 19. The vertical guide cylinder is further secured in place with two number 6-32 by ½ inch long cadmium-plated flat head screws in holes 822 and into the mating tapped holes 817 in the vertical support. There is vertical slot 823 with a semicircular notch 824 at the top and bottom. The inside diameter 825 is machined for a slip fit for the vertical roller bearing housing 29 (see FIGS. 29A and 29B). A portion of the area 826 is seated in the arc 809 on the intermediate plate in the final assembly of the trimmer.

A Teflon plastic base plate 23 (see also FIGS. 23A and 23B) has a small portion on the bottom of the fore end sloped upward, see at 827, so that the edge is about one-third the thickness of the base plate. The base plate 23 further exhibits an inwardly tapered and circular recess 828 (for providing clearance for the circular saw trimming blade as illustrated in FIG. 2) and has a narrow slot 829 (see the opposite side walls 830) on the center line of the fore and aft axis, from the fore edge to the recess. The Teflon base plate 23 is, as best shown in FIG. 2, positioned beneath the intermediate plate 20 with the circular recess centered beneath the vertical guide cylinder 22. There are three holes 831 for number 10 flat head screws and a hole 832 for a locating dowel.

Disposed between the intermediate plate 20 and base plate 23 is a composite plastic or aluminum spacer 24 (see also FIGS. 24A and 24B). There are three 10-24 tapped holes 833 and one 3/16 inch diameter hole 834 for the mounting screws. The spacer 24 is secured using a number 10-24 by 1½ inch long cadmium-plated flat head machine screw through the hole in the base plate 23 corresponding with hole 819 in the vertical support 21 and two number 10-24 by 1 inch long cadmium-plated flat head machine screws through the holes 831 in the base plate and two corresponding holes 812 in the intermediate plate 20. Viewing the illustrations collectively, it is seen as to how apertures 833 and 834 (see FIG. 24A) in spacer 24, as well as locations 812 and 813 in the intermediate plate 20 in order to join the elements together.

Referring again to FIG. 2, one end of a flexible coiled drive shaft 25 (again FIGS. 25A and 25B), which in one configuration is made of spring steel wire that is formed into a series of coils, is seated over a projection 835 (FIG. 29A) on a brass female coupling 26 (see also FIGS. 26A and 26B). The female coupling 26 has a hole 836 that mates with a male projection on coupling 31 and has a 6-32 tapped hole 837 in the side for a set screw for securing the couplings together. The other end of the flexible coiled drive shaft 25 is seated over a projection 838 (FIG. 27A) on brass coupling 27 (see also FIGS. 27A and 27B). There is a male projection 839 (FIG. 27A) on brass coupling 27 that mates with the female coupling on the air motor 33 (see FIGS. 33A-33C) drive shaft. The flexible coiled drive shaft 25 is silver soldered to the brass couplings 26 and 27.

In another configuration of the flexible coiled drive shaft, and such as is further represented in the progressive views of FIGS. 17A-17D, multiple strands of fine steel wire 840 (such as for example each exhibiting a diameter of 0.0015") are wound into a cable (FIG. 17A), such as 0.03" diameter, which is then over wrapped with a carbon or graphite tape, impregnated with a curable resin 841 (shown in FIG. 17B and as such exhibiting 0.01" thickness and a 0.1" width) and then encased in a pre-impregnated graphite/carbon woven sleeving 842 (FIG. 17C). The final diameter of the sleeving is about 0.07" and the encased composite filament and material is wound into a series of spirals or rings 843 (FIG. 17D), and such as around a section of aluminum ⅜" in diameter (not shown), that are spaced the diameter of the filament apart and with the end rings 844 and 845 closed. The coiled drive shaft is then heat cured to thereby form a firm flexible coil, which has one end seated over the projection 835 on the female coupling 26 and the other end seated over the male projection 838 on the male coupling 27, and which is bonded with an epoxy plastic compound.

A steel vertical roller bearing 28 (see FIGS. 28A and 28B) has a plurality of roller bearings 846 around the inner circumference and a clearance hole 847 in the top and a clearance hole 848 in the bottom. The vertical roller bearing is press fitted into the aluminum roller bearing housing 29 (see FIGS. 29A and 29B). The lower portion 849 of the roller bearing housing 29 is machined in diameter and height for the press fit of the vertical roller bearing 28 and the upper portion 850 is machined to provide clearance for the vertical roller bearing 28. There is a 10-32 tapped hole 851 for the attachment of the up and down positioning knob 39 (see again FIGS. 2, 4 and 39). There is a ⁵⁄₃₂" diameter hole 852 for inserting a set screw into the female coupling 26 during final assembly. The outside diameter of the vertical roller bearing housing 29 is machined for a slip fit in the vertical guide cylinder 22. There is a clearance hole 853 in the bottom of the vertical bearing housing. An inner ring 30 of the vertical roller bearing (see again FIG. 2 and FIGS. 30A and 30B) is press fitted onto a male projection 854 of female coupling 31 (FIGS. 31A-31C) for the circular saw trimming blade mounting shaft 32 (also FIGS. 32A-32C). The projection 854 that extends beyond the vertical roller bearing 28 is inserted into the female coupling 26 and secured with a 6-32 by ⅛ inch long Allen head set screw. There is a hole 855 for inserting the male projection on the circular saw trimming blade mounting shaft 32 and a 6-32 tapped hole 856 for a ⅛ inch long Allen head set screw to secure the circular saw trimming blade mounting shaft.

The circular saw trimming blade mounting shaft 32 (see FIGS. 32A-32C) has a shallow projection 857 for seating of a circular saw trimming blade, then a ⁵⁄₁₆-18 left-hand threaded portion 858 and then a male projection 859 that mates with the female coupling 31. There is a flat area 860 on the male projection and a keyway slot 861 in the bottom surface for inserting a tool to keep the shaft from turning while changing a circular saw trimming blade.

One or more ball bearings (not shown) may also be used in combination with the roller bearing 28, in which case the ball bearing is positioned below the roller bearing in the vertical bearing housing 29. A two-stack ball bearing can also be used in place of the vertical roller bearing 29. When the ball bearings are used, they are press fitted into the vertical bearing housing 29 and onto the male projection 854 of female coupling 31 (see FIGS. 31A-31C) for circular saw blade mounting shaft 32 (FIGS. 32A-32C), the same as for the roller bearing 28 and inner ring of the roller bearing.

An air motor 33, see FIG. 2 as well as FIGS. 33A-33C, is positioned with a coupling end thereof seated in the recess 801 in the air motor composite plastic housing 20 and secured by positioning a composite plastic retainer plate 34 (see also FIGS. 34A and 34B) over a drive end 863 of the motor 33. The motor is then secured by the retainer plate 34 with six number 6-32 by ⅜ inch long cadmium-plated flat head machine screws, and such as further being inserted through apertures 868 formed about a perimeter of the plate 34. An air supply adapter (not shown) may be threaded into a mating thread air inlet hole in an end of the air motor 33. It is to be understood that the present invention is not limited to embodiments which employ air motors. Electric motors, including battery-powered electric motors, may be substituted therefor.

Figure 35C:
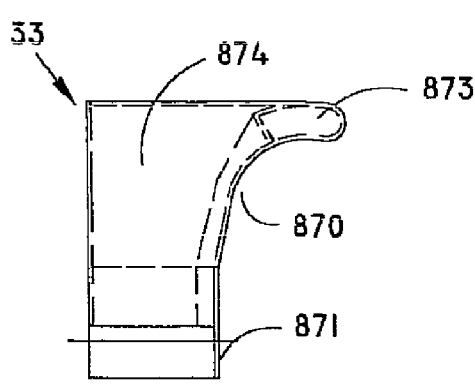
FIGS. 35A-35C illustrate a three-view drawing of the air motor discharged air baffle.
Figure 35A:
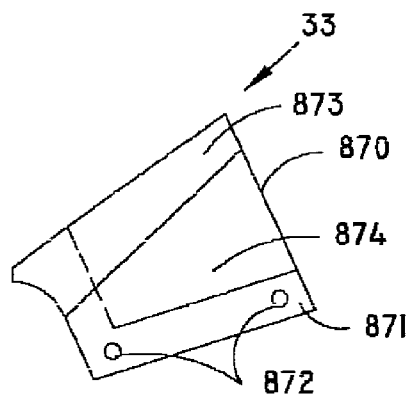
Figure 35B:
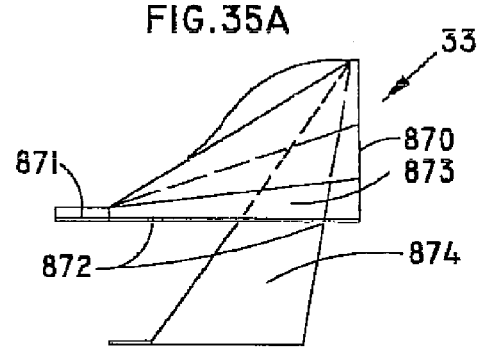

A fabricated sheet plastic discharged air baffle 35, that is shown in details "A", "B" and "C" of FIG. 3 as well as further shown in the views of FIGS. 35A-35C, is positioned with its semicircular end seated in the air motor housing 19 and with a horizontal hold down flange 871 on the top surface of the vertical support 21 and secured with two number 6-32 by ¼ inch long cadmium-plated round head machine screws through holes 872 and into mating holes 818 in the top surface of the vertical support. A thin bead of sealant glue is placed over the edges of the discharged air baffle 35 at the air motor housing 19, along the edge of the intermediate plate 20 and under the edge that is adjacent the vertical cylinder guide 22.

The discharged air baffle 35 further exhibits an upper duct 873 (FIG. 3A) that directs discharged air from the air motor through four upper slots 864 (FIGS. 3B and 3C), to the area above the vertical roller bearing 28 to assist in lubricating the bearing. Additionally, lower duct 874 directs the discharged air through five associated lower slots 864, through a slot 814 (see FIG. 20A) in the intermediate plate 20 to the area above the circular saw trimming blade 11 and to assist in keeping the saw blade teeth free of chips.

Figure 36A:
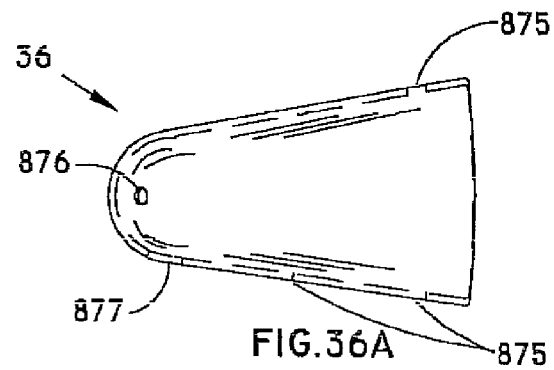
FIGS. 36A-36C illustrate a three-view drawing of the cover for the drive mechanism.
Figure 36C:
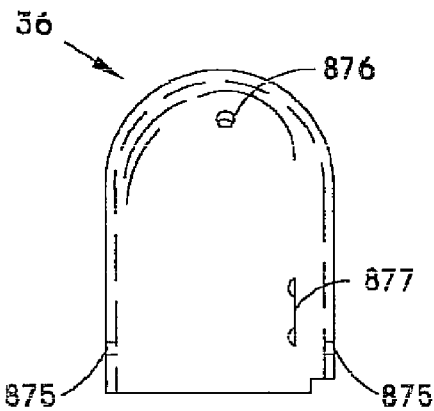
Figure 36B:
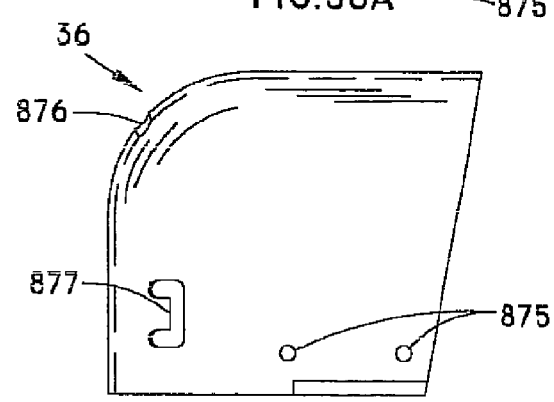

The flexible coiled drive shaft 25 and vertical roller bearing housing sub-assembly 28 is inserted into the vertical cylinder guide 22 and the male coupling 27 is inserted into the female coupling 26 on the air motor 33 and secured by tightening the coupling with open-end wrenches. A thermoformed plastic cover 36, see also FIGS. 36A-36C, is positioned over the discharged air baffle 35 to enclose the assembly and is secured with three number 6-32 by ⅜ inch long cadmium-plated round head machine screws.

A cylindrical plastic plug 37 (see FIG. 2 as well as FIGS. 37A and 37B) is inserted in a small hole 876 located in the top front of the plastic cover 36 after three drops of a lightweight grade oil is inserted to lubricate the vertical roller bearing 28. An additional and substantially "U" shaped aperture 877, defining a vertical slot, is defined through a side wall location of the plastic cover 36 and, as is referenced in further detail in FIGS. 4A-4C, operates in combination with a stem portion of a plastic knob 39 to facilitate both upper and down motion of the interchangeable tool 11 for quick replacement or substitution.

The air motor grip circular retaining plate 38 (FIG. 2, FIGS. 38A and 38B) that has a hub 879 with two 6-32 tapped holes 878 is positioned over an air inlet projection on the end of the air motor 33 and secured by two number 6-32 by ⅛ inch long Allen head set screws. An air motor speed control plate 40 (FIG. 1, FIGS. 40A and 40B) has a piece of Velcro® loop adhesive bonded to its top surface and extends over the end that is opposite the recess in the bottom surface and is bonded to the bottom surface. The speed control plate 40 is positioned with a recess 881 in the bottom seated over an air motor trigger 867 and the Velcro® loop on the bottom surface at the opposite end mating with a Velcro® hook pad 41 (also FIGS. 41A and 41B) that is mounted on the air motor 33 toward the air inlet end.

The knob 39, which in this embodiment is made of a black plastic material, (see also FIGS. 39A and 39B) exhibits a number 8-32 by ³⁄₁₆ inch long threaded projection 880, is inserted through the vertical slot 877 in the cover and vertical cylinder guide and into a mating number 8-32 tapped hole in the vertical roller bearing housing 29 for locking the vertical roller bearing housing in the raised and in the lowered locked positions as shown in FIGS. 4A, 4B and 4C. In particular, and with the vertical roller bearing housing in the raised position, it is rotated slightly clockwise into the locked position as shown in FIG. 4A.

A regular circular trimmer saw blade, such as again previously illustrated at 11 in FIG. 2, is positioned on the circular saw trimming blade mounting shaft 32 so that its array of teeth (not shown) will be rotated clockwise when the shaft is driven. The saw blade is secured by tightening the 5/16-18 left-hand threaded cadmium-plated hex nut 42 (see FIGS. 42A and 42B in addition to FIGS. 4A-4C).

The male projection 859 of the circular saw trimming blade mounting shaft 32 is inserted into the female coupling 31 on the bottom of the flexible drive shaft 25 and the circular saw blade mounting shaft 32 is lowered as shown in FIG. 4B and secured by inserting and tightening a number 6-32 by 3/16 inch long Allen head set screw in the side of the female coupling 31. With the circular saw trimming blade mounting shaft 32 secured, the vertical roller bearing housing 29 (see also FIGS. 29A and 29B) is rotated clockwise to the locked position as shown in FIG. 4C and locked by tightening the black plastic knob 39.

A formed plastic retainer clip 43 (FIG. 1, FIGS. 43A-43C) is positioned in a notch 806 in the front face of the air motor housing 19 and secured with a 6-32 by 1/4 inch long cadmium-plated flat head machine screw. An Allen wrench for a number 6-32 is placed in the small hole 808 in the sloped edge of the air motor housing 19 and just below the plastic retainer clip 43 and then turned counterclockwise to be held under the clip. With an air supply adapter (not shown) inserted into the mating threaded air inlet hole in the air motor and connected to a factory air supply, the adaptive, ergonomic, air motor driven circular saw blade hand-held trimmer is ready to be used.

Alternate Embodiments of the Invention

Figure 5:
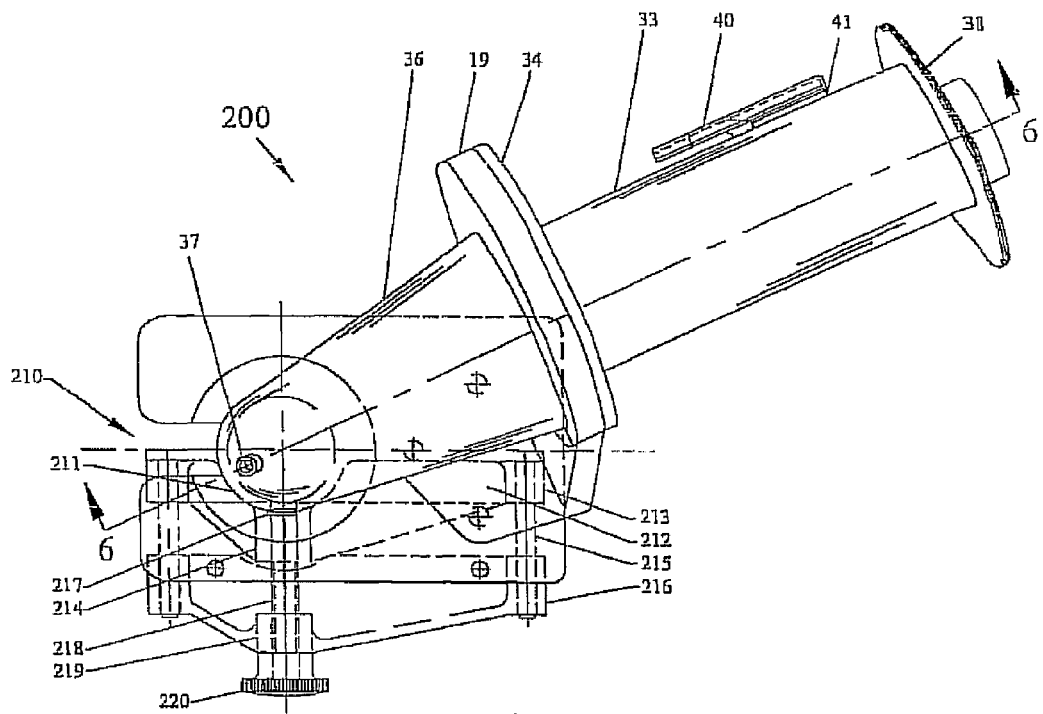
FIG. 5 is a top view, similar to that shown in FIG. 1, of a first alternate embodiment of the invention adapted for use as a hand-held router.
Figure 6:
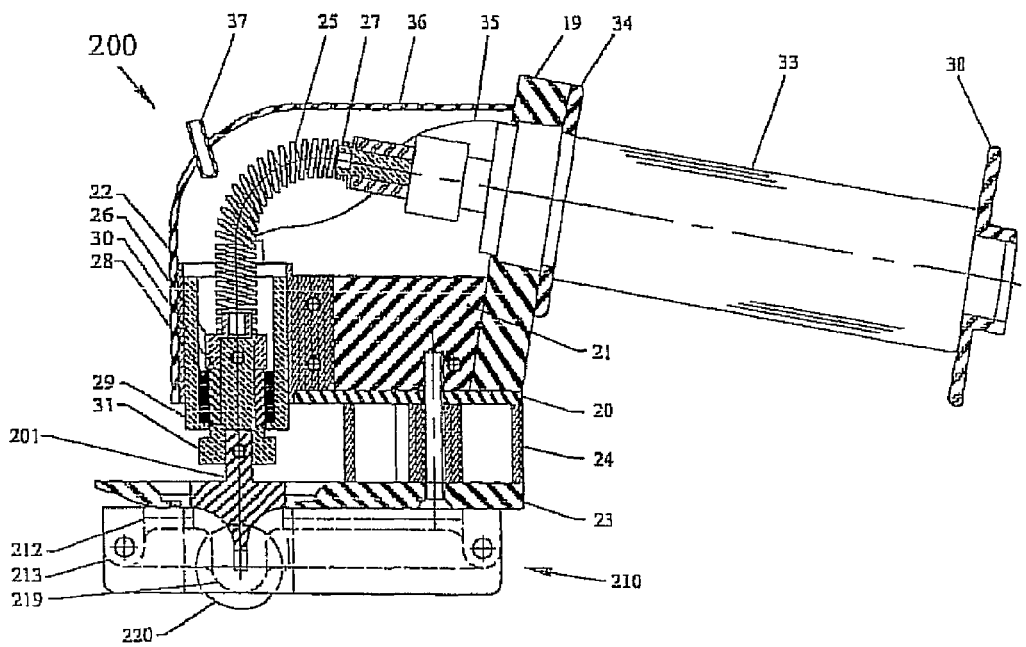
FIG. 6 is a cross-sectional view taken along line 6-6 of FIG. 5 and illustrating the inner working components of the first alternate embodiment of FIG. 5.

A first alternate embodiment of an adaptive, ergonomic, air motor driven multi-purpose hand-held trimmer adapted to be used as a hand-held router is shown at 200 in FIGS. 5 and 6. The hand-held trimmer assembly 200 basically consists of most of the components that are used in the hand-held trimmer assembly illustrated in the primary embodiment of FIGS. 1 and 2, with the exception that the circular saw blade and circular saw blade mounting shaft have been replaced by a circular radius cutter of different radii. A straight cutter, bevel cutters and different diameter abrasive wheels and with a vertical guide fence assembly are shown in FIGS. 44A-44C and which is adjustable horizontally in relation to the fore and aft center line of the base plate and is bolted to the bottom of the base plate. This configuration permits the unit to be used as an air motor hand-held router for trimming with a straight cutter, making different size radii or bevels on the edges of wood, and making beveled edges on glass with the abrasive wheels.

Referring again to FIG. 5, which is a top view, the hand-held router includes a horizontal adjustable vertical fence 210 bolted to a bottom of the base plate 23. As further shown in FIG. 6, which is again a cross-sectional view taken along 6-6, the vertical side panel of the adjustable vertical fence subassembly is at an angle of 90 degrees to the base plate 23, and includes a semicircular portion 211.

A panel 212, that is parallel with the base plate 23, has a small semicircular boss 213 at each end that extends at an angle of 90 degrees to the vertical panel. A large semicircular boss 214 is opposite a semicircular portion 211 and extends at an angle of 90 degrees to the vertical panel twice the distance as the small bosses at the ends.

A guide pin 215 is located in each of the small bosses and which mate with a mirror image component 216, except that there is no semicircular portion in the vertical side panel. A hole is located in the large semicircular boss 214, opposite the semicircular portion 211 of the vertical side panel, and exhibits the same center line, in which there is a small hole for a 1/16 inch diameter roll pin 217 about 3/16 of an inch from the semicircular portion 211 of the side panel and at angle of 90 degrees to the radius of the large hole.

A shaft 218 exhibits a slip fit in the large hole in the center of the large semicircular boss, and includes a groove that permits it to rotate around the roll pin 217. A portion of the shaft 218 extends beyond the face of the semicircular boss 214, and is threaded to mate with interengaging threads in a mirror image large semicircular boss 219 in the portion that is attached to the base plate 23 of the trimmer with two number 10-24 by 3/8 inch long cadmium-plated flat head machine screws.

A knob 220 is rigidly attached to the shaft with a 1/8 inch diameter roll pin. When the knob is turned clockwise, the movable vertical fence 210 is adjusted as needed 90 degrees away from the fore and aft center line of the base plate. There is further located a recess in the bottom surface of the section that is bolted to the base plate 23, for the angled portions of the horizontal bottom panel of the movable vertical fence.

Figure 7:
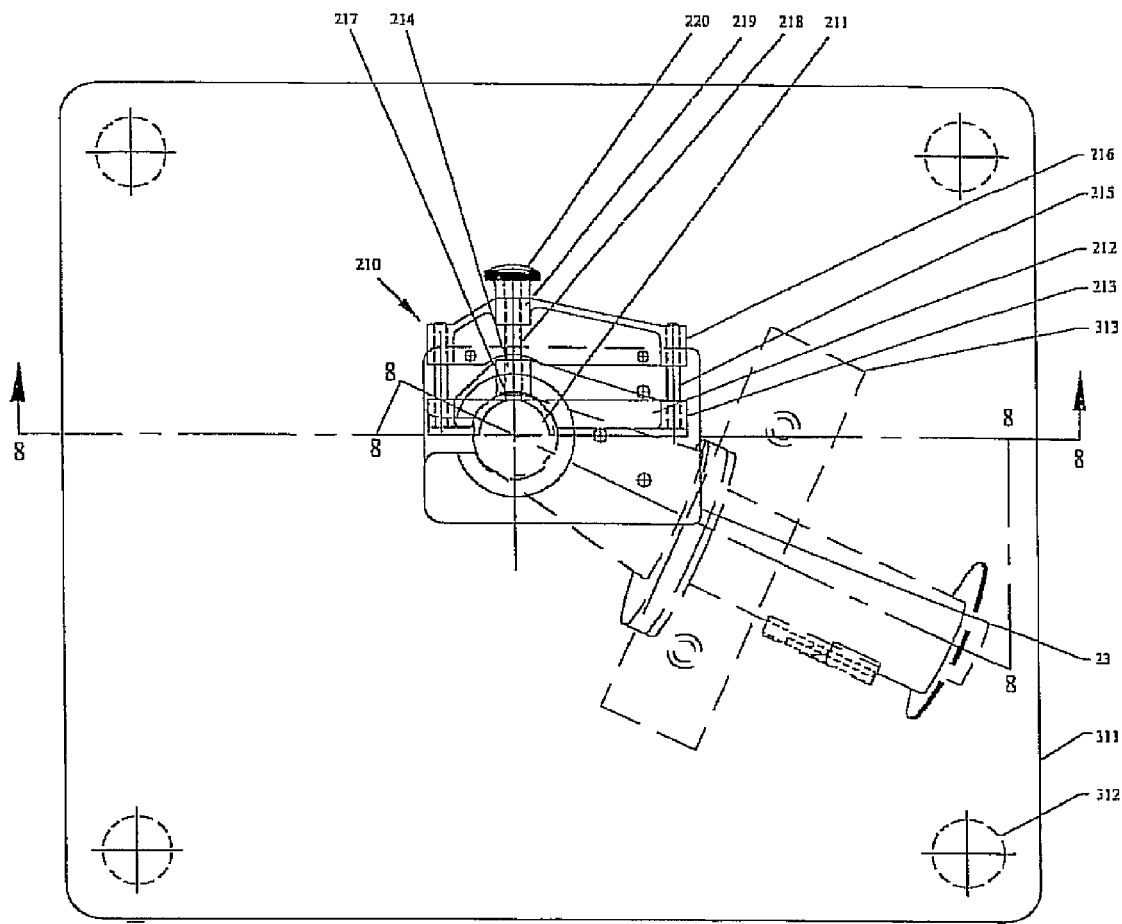
FIG. 7 is a top view of a second alternate embodiment of the present invention adapted for use as a fixture mounted and small tabletop router.
Figure 8:
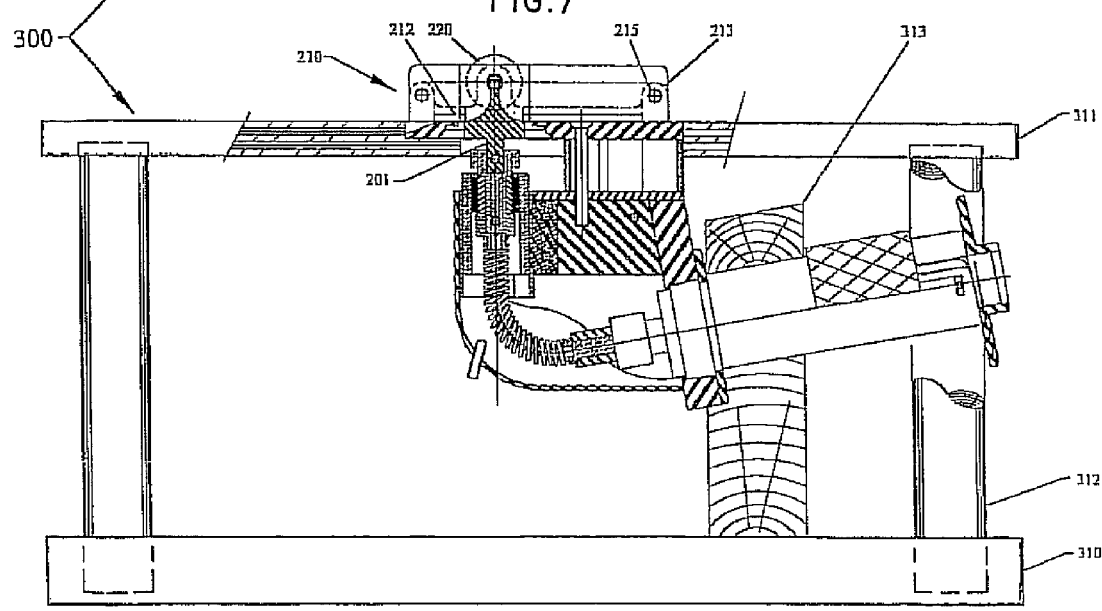
FIG. 8 is a cross-sectional view of the second alternate embodiment of the invention taken along line 8-8 of FIG. 7.

A second alternate embodiment of an adaptive, ergonomic, air motor driven multi-purpose hand-held trimmer assembly 300, is shown in FIGS. 7 and 8, and which is adapted to be used as a small tabletop router. The tabletop router consists of the same basic components as in the hand-held trimmer assembly 200, except the hand-held trimmer adapted to be used as a hand-held router is mounted inverted with the bottom surface of the base plate flush with the top surface of a small rectangular stand.

FIG. 7 is a top view of the tabletop router assembly that shows the horizontal adjustable vertical fence near the center and a vertical mounting 313 (see FIG. 7). The stand has a wooden base plate 310 with wood round vertical supports 312 at the four corners for supporting a Formica faced top plate 311. The tabletop router can use the same accessories as the hand-held router for finishing the edges of articles made of wood, plastic and even glass.

Figure 9:
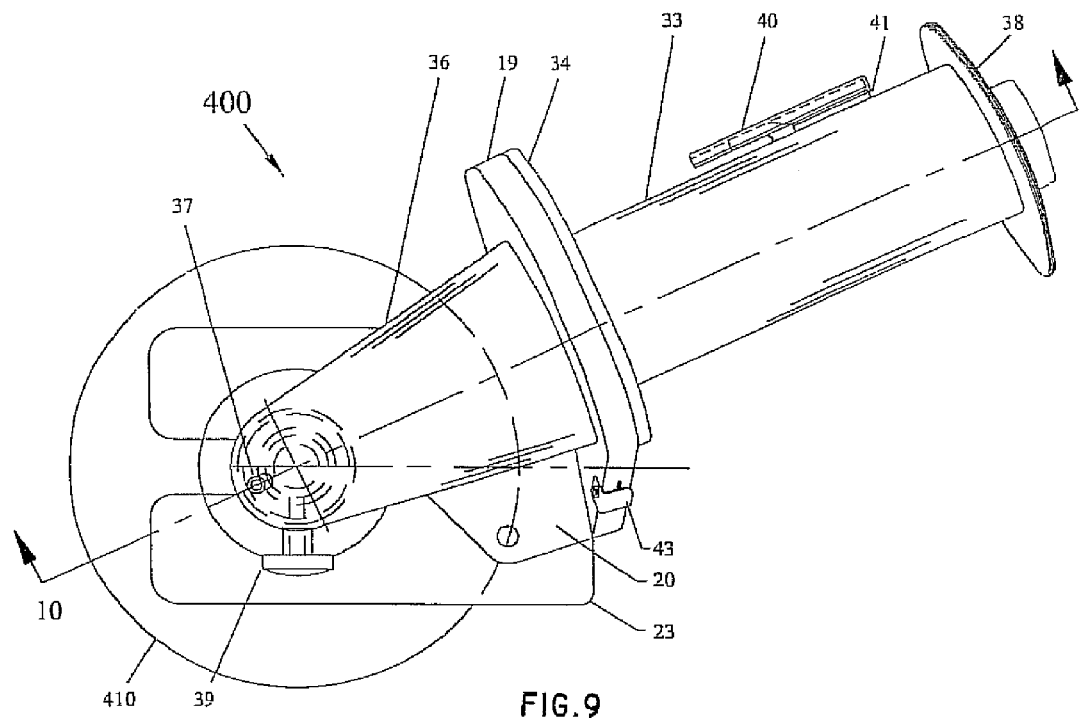
FIG. 9 is a top view of a further alternate embodiment of the invention adapted for use as a hand-held disk sander, cloth buffer and soft fleece bonnet polisher.
Figure 10:
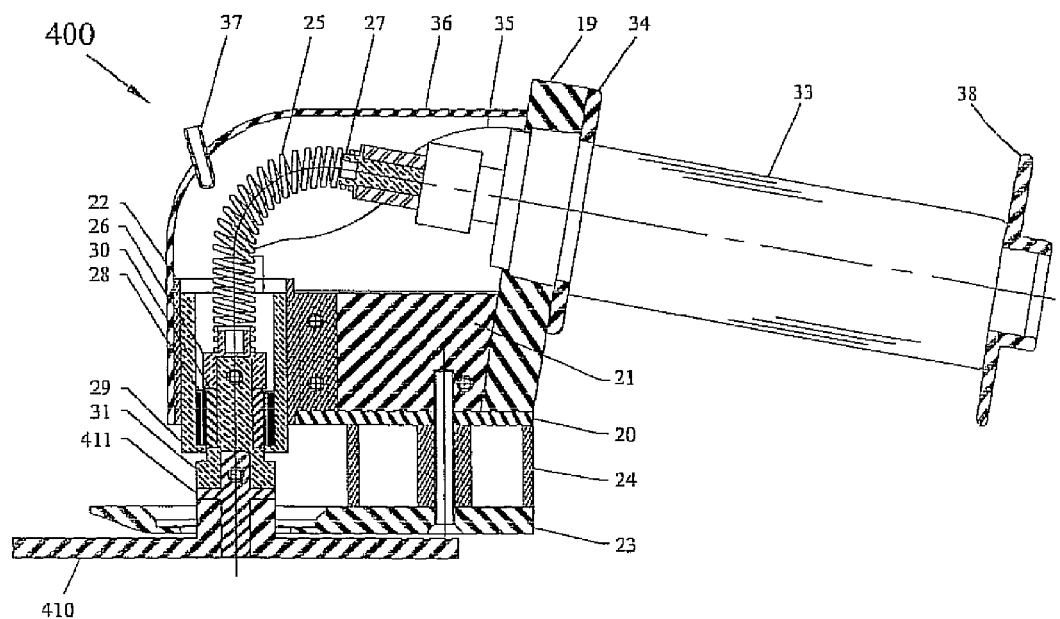
FIG. 10 is a cross-sectional view taken along line 10-10 of the alternate embodiment of the invention of FIG. 9.

A third alternate embodiment of an adaptive, ergonomic, air motor driven multi-purpose hand-held trimmer assembly 400, is shown in FIGS. 9 and 10, as adapted to be used as a hand-held disk sander, soft cloth buffer and fleece bonnet polisher. FIG. 9 is a top view of the hand-held trimmer assembly as a circular disk sander. FIG. 10 is a cross-sectional view taken along 10-10 of FIG. 9.

Most of the components used in the hand-held trimmer as shown in FIGS. 1 and 2 are utilized in the hand-held disk sander. The disk 410 shown in FIGS. 45A and 45B may be made of aluminum or composite plastic. There is a hub 412 on the top surface of the disk with a 5/16-18 tapped hole at its center for attaching the disk to the mounting shaft, and there is a 6-32 tapped hole 413 in the side of the hub for a 6-32 by 3/16 inch long set screw to secure the disk to the mounting shaft 411. A new mounting shaft as shown at 411 in FIG. 46 is used to attach the disk 410 to the female coupling 31 on the end of the flexible coiled drive shaft 25. Paper or emery cloth abrasive disks can be mounted on the disk, as can soft cloth buffers or a fleece bonnet can be placed over the disk for polishing of painted or plastic surfaces.

Figure 11:
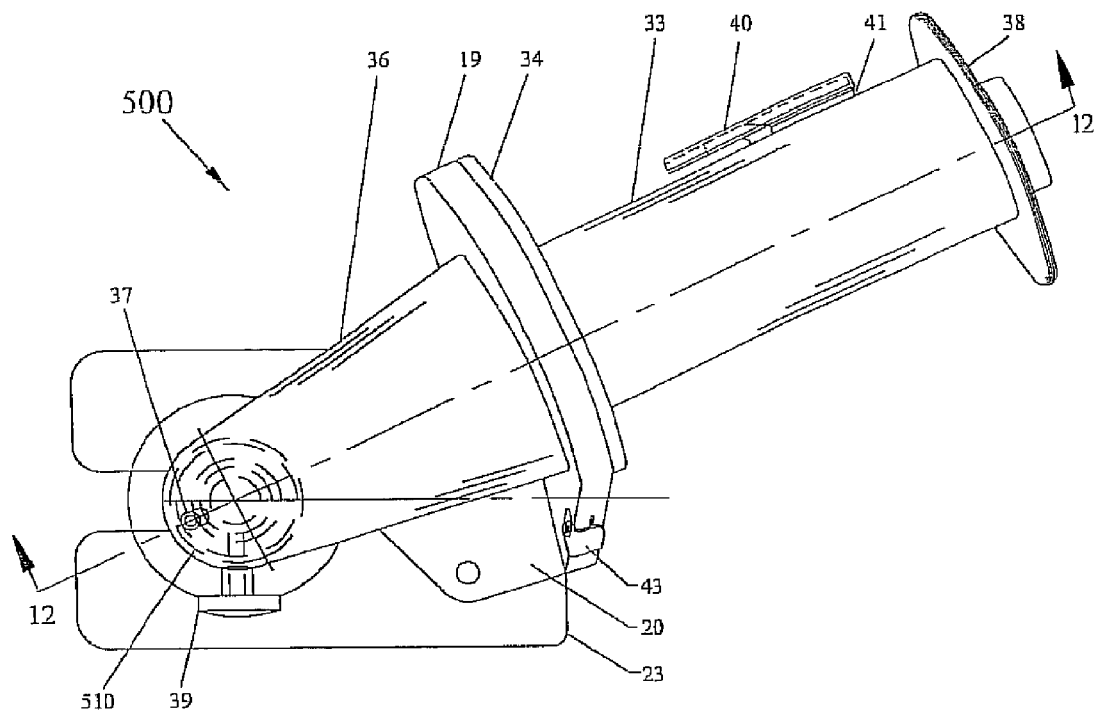
FIG. 11 is a top view of the fifth alternate embodiment of the invention adapted for use as a hand-held drum sander.
Figure 12:
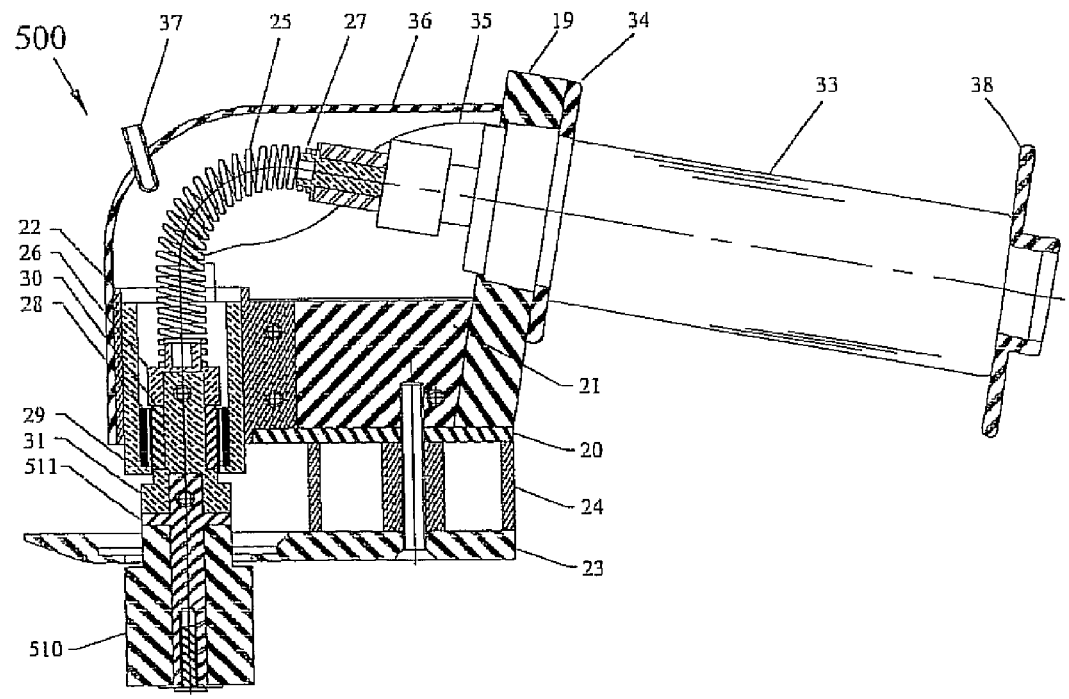
FIG. 12 is a cross-sectional view of the fifth alternate embodiment of the invention taken along line 12-12 of FIG. 11.

A fourth alternate embodiment of an adaptive, ergonomic, air motor driven multi-purpose hand-held trimmer assembly 500, is shown in FIGS. 11 and 12, as adapted to be used as a drum sander or buffer. FIG. 11 is a top view of the hand-held trimmer assembly as a drum sander. FIG. 12 is a cross-sectional view taken along line 12-12 of FIG. 11.

Figure 47A:
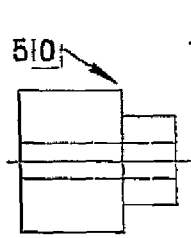
FIGS. 47A and 47B are side and end view drawings of a circular drum that is mounted on the shaft shown in FIGS. 48A-48C.
Figure 47B:
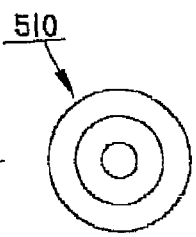
Figures 48A, 48B, 48C:
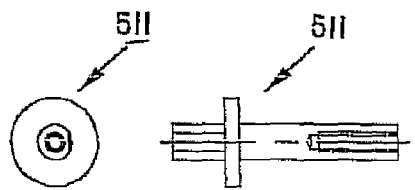
FIGS. 48A-48C illustrate a first side view and second and third end views of the circular drum mounting shaft according to the fourth alternate embodiment of the invention to be used as a hand-held drum sander.

Most of the components used in the hand-held trimmer as shown in FIGS. 1 and 2 are utilized in the hand-held drum sander. A drum 510, also shown in FIG. 47, is made of rubber. A new mounting shaft 511, also shown in FIGS. 48A-48C, is used to attach the drum to the female coupling on the end of the flexible coiled drive shaft. The horizontal adjustable vertical fence assembly 210 shown in FIG. 44A can also be bolted to the bottom surface of the base plate 23. Also, the drums can be of different diameters up to one inch and be of different lengths.

Figure 13:
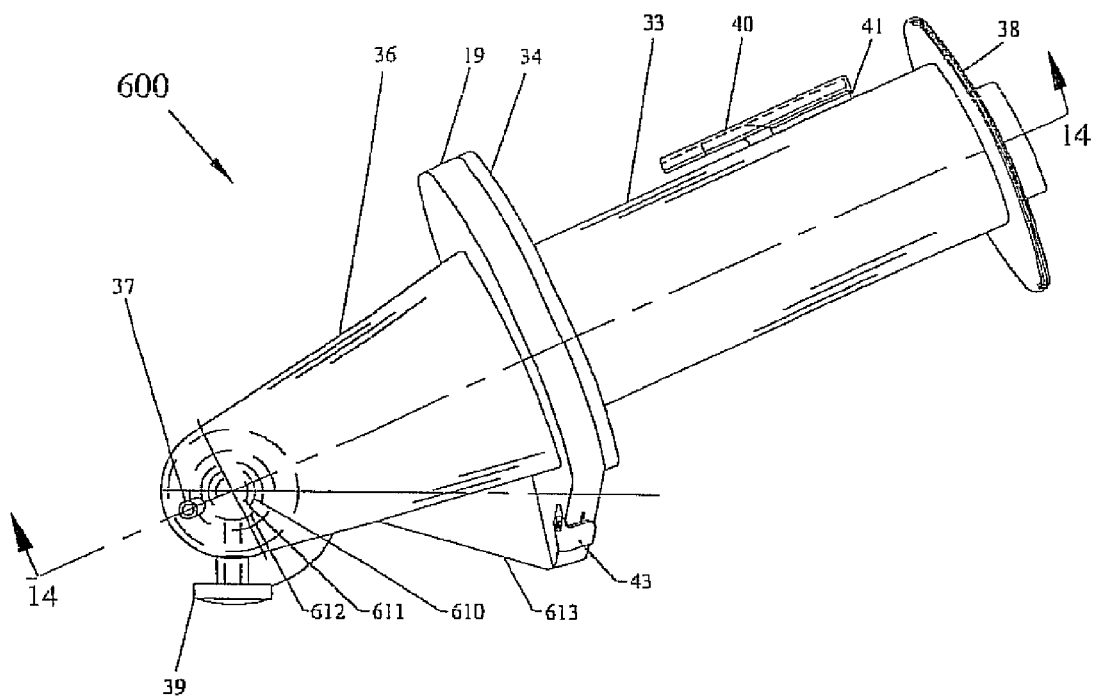
FIG. 13 is a top view of a yet further alternate embodiment of the present invention adapted for use as a hand-held drill.
Figure 14:
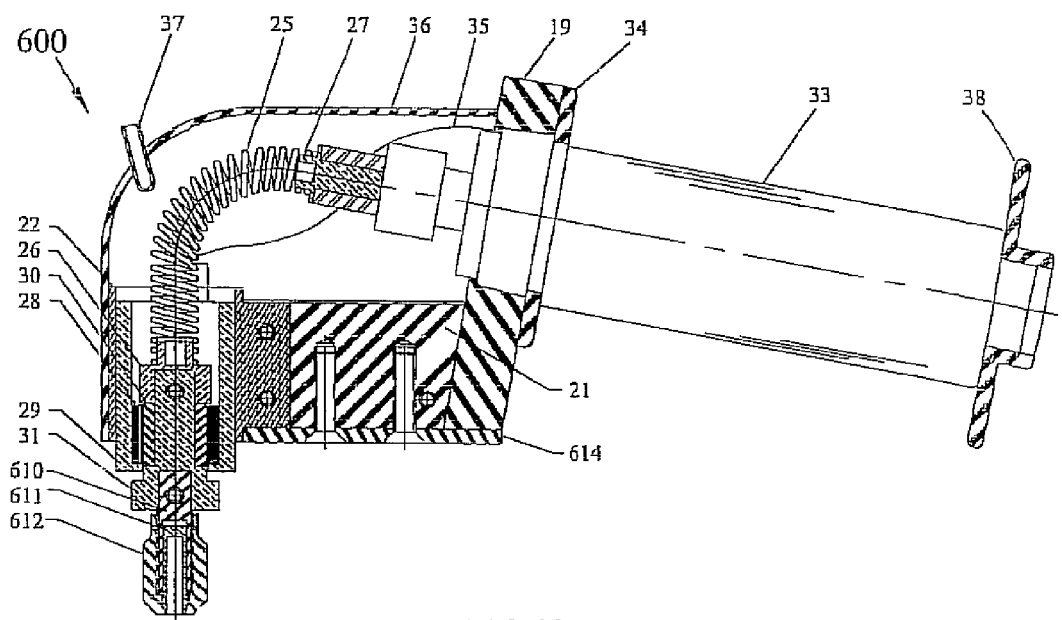
FIG. 14 is a cross-sectional view taken along line 14-14 of FIG. 13 of the alternate embodiment of FIG. 13.
Figure 49B:
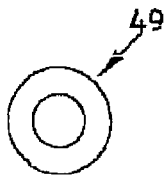
FIGS. 49, 50 and 51 are drawings of a mounting shaft coupling/collet holder, a collet and collet clamp nut, respectively, that when attached, adapt the fifth alternate embodiment of the invention to be used as a hand-held drill.
Figure 49A:
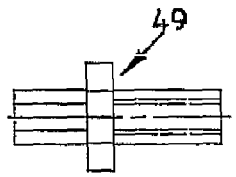
Figure 49C:
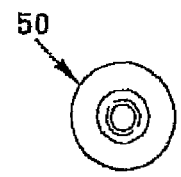
Figure 50A:
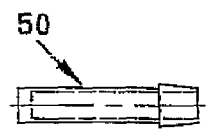
Figure 50B:
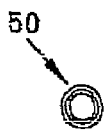
Figure 51B:
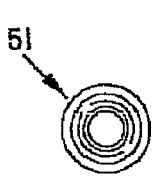
Figure 51A:
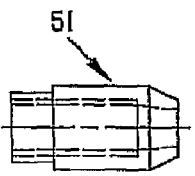
Figure 51C:
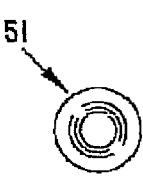

A fifth alternate embodiment of an adaptive, ergonomic, air motor driven multi-purpose hand-held trimmer assembly 600 is shown in FIGS. 13 and 14, as adapted to be used as a hand-held drill. FIG. 13 is a top view of the hand-held trimmer assembly as a drill. FIG. 14 is a cross-sectional view taken along line 14-14 of FIG. 13. Most of the components used in the hand-held trimmer as shown in FIGS. 1 and 2 are utilized in the hand-held drill. Shown generally in FIG. 14 and individually at 610, 611 and 612 in FIGS. 49, 50 and 51 are the mounting shaft/collet holder, collet, collet clamp, respectively. A drill bit (not shown) is secured within the collet clamp and holder assembly. A readily available adjustable drill chuck (not shown) can also be attached to the mounting shaft that mates with the female coupling on the end of the flexible coiled drive shaft.

Figure 15:
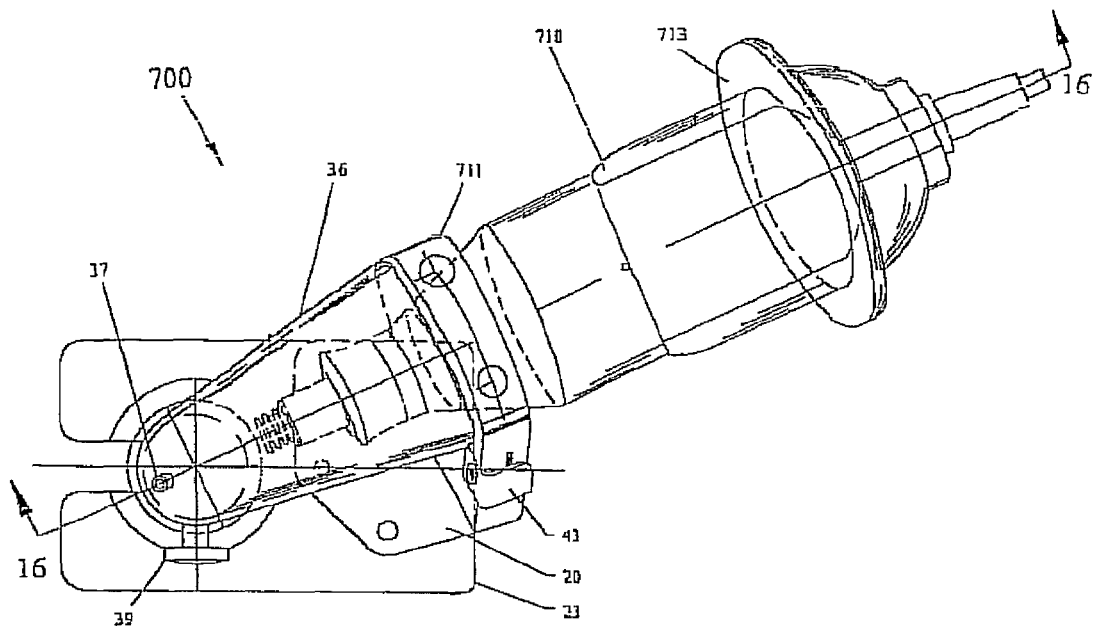
FIG. 15 is a top view of a still further alternate embodiment of the invention and exhibiting a modified body design adapted for use as a hand-held trimmer utilizing an electric motor.
Figure 16:
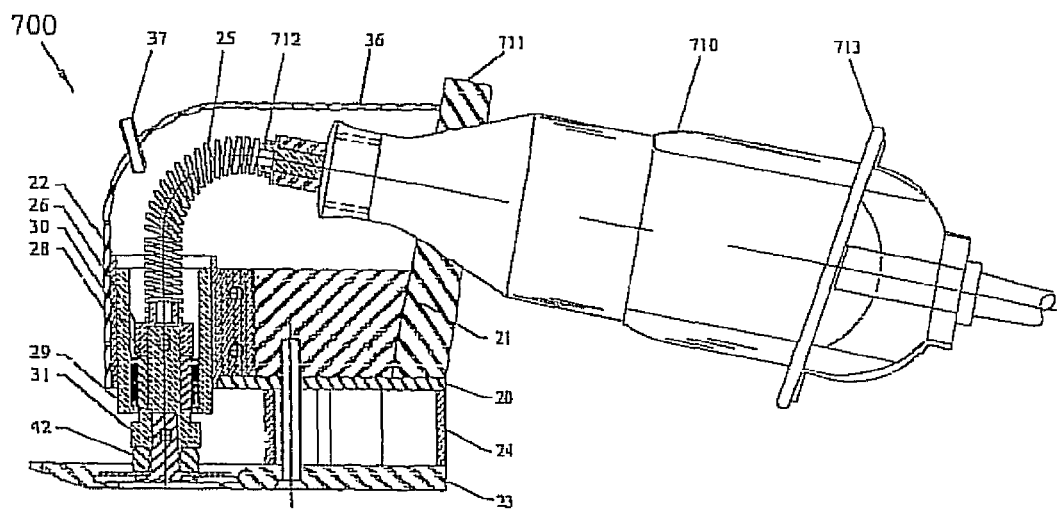
FIG. 16 is a cross-sectional view taken along line 16-16 of the alternate embodiment of FIG. 15.

A sixth alternate embodiment of an adaptive, ergonomic, air motor driven multi-purpose hand-held trimmer assembly 700, is shown in FIGS. 15 and 16, adapted to utilize a 110 volts AC variable speed electric motor or a rechargeable battery pack such as a NiCad (nickel-cadmium) battery pack variable speed DC motor operated hand-held trimmer for all of the afore described hand-held trimmer uses. FIG. 15 is a top view of an electric 110 volts AC variable speed motor hand-held trimmer assembly. FIG. 16 is a cross-sectional view taken along line 16-16 of FIG. 15.

Figure 52A:
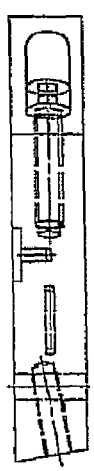
FIGS. 52A-52C are side, back and bottom views of the motor housing that is used to adapt the sixth alternate embodiment of the invention to utilize a 110 volts AC electric motor or NiCad (nickel-cadmium) battery pack motor as the power source.
Figure 52B:
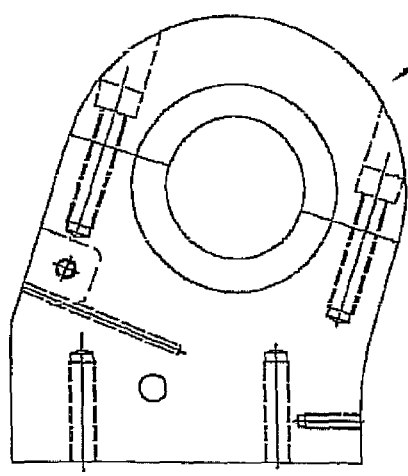
Figure 52C:
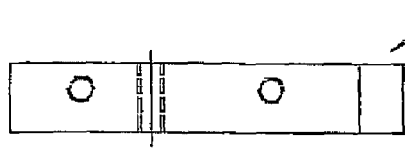

All of the components used in the hand-held trimmer shown in FIGS. 1 and 2, with the exception of the vertical housing 19, the air motor retainer plate 34 and the hand grasp retaining plate 38 and the coupling for joining the flexible coiled drive shaft 25 to the electric motor 33, are the same. Shown at 711 in FIGS. 52A-52C is the two-section vertical electric motor housing in which the electric motor is clamped to thereby utilize it as the drive power source for the adaptive, ergonomic, multi-purpose hand-held trimmer. The electric motor housing includes mounting locations, where indicated in FIGS. 52A-52C, and is designed so that the electric motor can be readily rotated about the fore and aft axis in order to position it in the location that will be the most comfortable and easiest for moving the variable speed control switch.

Figure 53B:
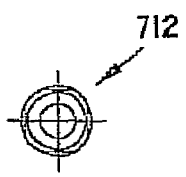
FIGS. 53A-53C illustrate axial cross-sectional and first and second end view drawings of the coupling on the flexible coiled drive shaft to mate with the drive shaft on the electric motor of the electric trimmer.
Figure 53A:
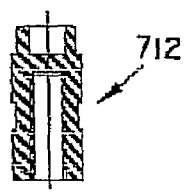
Figure 53C:
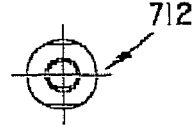

The female coupling 712 shown also in FIGS. 53A-53C, that is attached to the end of the flexible coiled drive shaft 25, is threaded to mate with the threaded projection on the variable speed electric motor drive shaft 906. Further shown in FIGS. 18A-18C, as well as in each of FIGS. 15 and 16, is a hand grasp retaining plate 713 that is configured to fit the body of the electric motor and which includes brackets 714 to attach it to a ring that fits over a projection on the electrical power cord end of the electric motor and is secured with two 6-32 by ⅛ inch long set screws.

Titanium Based Flexible Drive Shaft

In accord with particular aspects of the present invention there is provided a flexible drive shaft fabricated from a titanium material. The drive shaft is very light in weight, highly flexible, and is capable of transmitting very large levels of torque. Furthermore, it is rugged and simple in construction. The drive shaft is fabricated from a titanium material which, in the context of this disclosure, is understood to refer to pure titanium as well as titanium based alloys. Such titanium based alloys typically include at least 80% titanium, and in many instances at least 85% titanium. One group of titanium based alloys having utility in the present invention is primarily comprised of titanium with minor amounts of aluminum and vanadium. One specific alloy of this type comprises 90% by weight titanium together with 6% by weight of aluminum and 4% by weight of vanadium. Other titanium based alloys are also known in the art and may be utilized in the practice of this invention.

A drive shaft in accord with the present invention is fabricated from an elongated strip of the titanium material having a length dimension, a width dimension which is less than the length dimension and a thickness dimension which is less than the width dimension. The strip is wound into a helical coil so as to define a coiled body of titanium material having a first end and a second end. A first coupler is affixed to the first end of the coil and a second coupler is affixed to the second end of the coil. The couplers are specifically configured to engage motors, tools, power take off shafts, other couplers and the like. In a particular aspect of the present invention, one of the couplers is configured to engage a power providing shaft of a motor and the other coupler is configured to engage a tool.

Figure 54:
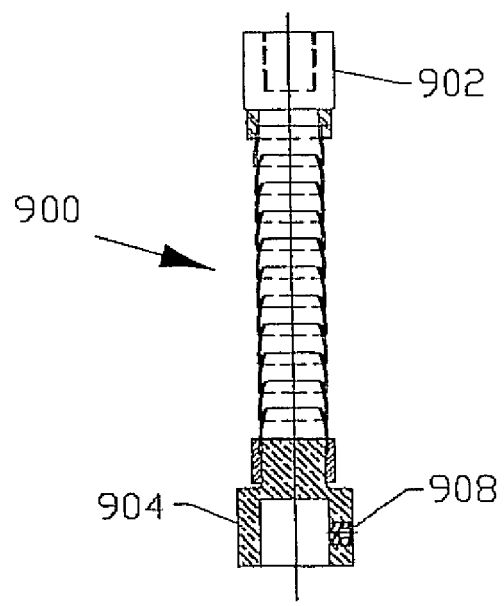
FIG. 54 illustrates a specific titanium based flexible drive shaft in accord with the present invention.
Figure 55:
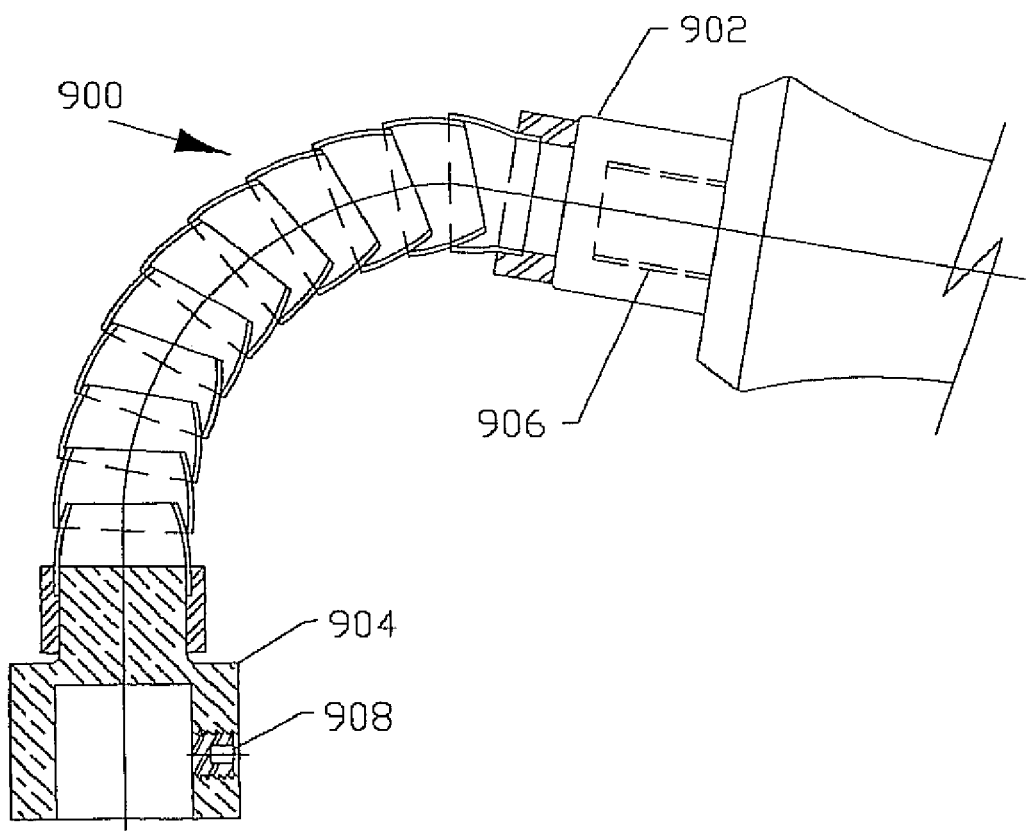
FIG. 55 illustrates the drive shaft of FIG. 54, as disposed for use in a trimmer of the type shown in the previous figures.

The drive shaft of the present invention may be variously configured, and one specific embodiment of shaft is shown in FIGS. 54-55. Referring now to FIG. 54, there is shown a cross-sectional view of a flexible, titanium based drive shaft 900 configured in accord with the present invention. As will be seen, the shaft 900 is configured as a helically wound coil. In this embodiment the coil is a closed coil when the coil is aligned along a straight axis. That is to say, each turn of the coil partially overlaps an adjacent turn so that there is no open space between the turns of the coil. It will further be noted that in this instance, the strip of material which is wound into the coil is curved along its width dimension. While variously configured coils may be used in the present invention, it has been found that curving the material along the width dimension provides a coil in which the various turns interlock to some degree so as to stabilize the coil when it is transmitting torque. The curvature may extend across the entire width of the strip of material or it may extend along only portions of the width. While the curvature is shown in these drawings as being a relatively smooth curvature, it is to be understood that irregular curvatures, as well as grooves, ridges and other similar features, may also be employed, and such features can provide for additional interlocking of the coiled structure. As will further be seen in FIG. 54, the shaft includes a first coupler 902 and a second coupler 904 affixed thereto.

Referring now to FIG. 55, the drive shaft 900 is shown in a use configuration, as for example in various of the embodiments of trimmers shown in the previous figures. In this regard, the shaft 900 is curved, in an operating position, and as is illustrated, the first coupler 902 is joined to a power shaft 906 of a motor. The second coupler 904 is typically connected to a coupler 31 which holds a saw blade or other cutting element which fits into the socket thereof and is retained therein by a set screw 908. It is appreciated from FIGS. 54-55 that the shaft 900 made from the strip with a curved width dimension and further configured as a helically wound coil, provides a closed coil, i.e. each turn of the coil partially overlaps an adjacent turn so that there is no open space between the turns of the coil, and the turns interlock to some degree so as to stabilize the coil when it is transmitting torque even when the coil is bent to at least 90 degrees.

The flexible, titanium based shaft of the present invention may be fabricated in a variety of sizes, depending upon particular applications to which it is applied. In general, the thickness of the strip which is wound to form the shaft will range up to ¼ inch for large, high power applications. In those instances where the drive shaft is used with hand tools, such as the trimmer described hereinabove, the shaft will be formed from strip stock having a width in the range of 0.10 to 0.25 inch and a thickness in the range of 0.010 to 0.035 inch. Length of the finished coil will depend upon the particular tool application; but, will typically fall in the range of 1 to 4 inches. Larger or smaller coils may be likewise fabricated for other specific applications, and the combination of flexibility, high torque capacity and light weight of these coils will make them ideally suited for use in small precision machinery, since the shafts will allow for the transmission of high levels of power through angles of less than 90 degrees, and as such will manifest performance characteristics significantly better than those achieved with prior art flexible drive shafts.

The foregoing drawings, discussion and description illustrate some specific embodiments of drive shafts. However, other embodiments and configurations including variously configured open and closed coil structures of various sizes will be readily apparent to those of skill in the art. Accordingly, the foregoing drawings, discussion and description are illustrative of specific embodiments of the invention but are not meant to be limitations upon the practice thereof.

What is claimed is:

1. A hand tool comprising:
   a housing attached to a hand-held motor, said hand-held motor extending along a center line and dimensioned to be held and maneuvered with a single hand;
   a flexible drive shaft
   having an elongated strip of a titanium material, said strip having a length dimension, a width dimension which is less than said length dimension, and a thickness dimension which is less than said width dimension, said strip being curved along its width dimension and being bent along its length dimension and wound into a helical coil, wherein said helical coil is a closed helical coil and is wound so as to produce a plurality of turns wherein each turn of said coil overlaps with an adjacent turn, said helical coil having a first and a second end;
   a first coupler affixed to the first end of the coil; and
   a second coupler affixed to a rotatable tool and the second end of said coil;
   said housing holding said first coupler at a fixed location relative to said second coupler, said center line of said motor and a central axis of said rotatable tool intersecting at an angle of less than 90 degrees, and said drive shaft operable to transfer torque from said motor to said rotatable tool.

2. The flexible drive shaft of claim 1, wherein said titanium material comprises pure titanium.

3. The hand tool of claim 1, wherein said titanium material comprises an alloy of titanium.

4. The hand tool of claim 3, wherein said alloy of titanium includes aluminum and vanadium.

5. The hand tool of claim 4, wherein said alloy of titanium includes, on a weight basis, 6% aluminum and 4% vanadium.

6. The hand tool of claim 1, wherein the thickness of said elongated strip of a titanium material is in the range of 0.010 to 0.035 of an inch.

* * * * *